(12) United States Patent
Henninger et al.

(10) Patent No.: US 10,082,074 B2
(45) Date of Patent: Sep. 25, 2018

(54) FOUR-STROKE RECIPROCATING PISTON ENGINE IN A V CONFIGURATION HAVING 16 CYLINDERS

(71) Applicant: Liebherr Machines Bulle SA, Bulle (CH)

(72) Inventors: Christoph Henninger, Lausanne (CH); Iulian Vasile, Albeuve (CH); Simon Heintz, Bulle (CH); Martin Stadelmann, St. Ursen (CH)

(73) Assignee: Liebherr-Machines Bulle SA, Bulle (CH)

( * ) Notice: Subject to any disclaimer, the term of this patent is extended or adjusted under 35 U.S.C. 154(b) by 81 days.

(21) Appl. No.: 15/397,654

(22) Filed: Jan. 3, 2017

(65) Prior Publication Data

US 2017/0191411 A1     Jul. 6, 2017

(30) Foreign Application Priority Data

Jan. 4, 2016   (CH) ...................................... 0005/16

(51) Int. Cl.
*F02B 75/22*     (2006.01)
*F02B 75/02*     (2006.01)
(Continued)

(52) U.S. Cl.
CPC .............. *F02B 75/22* (2013.01); *F02B 75/02* (2013.01); *F16C 3/04* (2013.01); *F16F 9/12* (2013.01);
(Continued)

(58) Field of Classification Search
CPC .................... F02B 2075/1864; F02B 75/22
(Continued)

(56) References Cited

U.S. PATENT DOCUMENTS

| 1,752,713 A | 4/1930 | Whatley |
| 2,740,389 A | 4/1956 | Reyl |

(Continued)

FOREIGN PATENT DOCUMENTS

| DE | 2615742 A1 | 10/1977 |
| EP | 1367238 A1 | 12/2003 |

(Continued)

OTHER PUBLICATIONS

Wilson, W., "Practical Solution of Torsional Vibration Problems: With Examples from Marine, Electrical, and Automobile Engineering Practice," Available as Early as Jan. 1, 1935, Chapman & Hall, Ltd., London, England, 227 pages.

(Continued)

*Primary Examiner* — Marguerite McMahon
*Assistant Examiner* — Tea Holbrook
(74) *Attorney, Agent, or Firm* — McCoy Russell LLP

(57) ABSTRACT

The present disclosure relates to a four-stroke reciprocating piston engine in a V configuration having 16 cylinders, having a counter-clockwise direction of rotation, having an ignition timing control which fires the cylinders A1 to A8 and B1 to B8 in one of the following firing sequences, wherein the direction of rotation and the cylinder numbering are defined in accordance with DIN ISO 1204:

a) A1-B2-A5-B4-A7-B8-A3-A8-B5-A6-B7-A2-B3-A4-B1-B6
b) A1-B2-A5-A2-B3-A4-B1-A8-B5-A6-B7-B4-A7-B8-A3-B6
c) A1-B4-A3-B2-A7-B6-A5-B8-B3-A8-B7-A4-B5-A2-B1-A6
d) A1-B4-A3-B2-B5-A2-B1-A6-B3-A8-B7-A4-A7-B6-A5-B8
e) A1-B2-A6-B4-A8-A4-B1-A7-B6-A5-B8-A2-B3-B7-A3-B5

(Continued)

f) A1-B2-A6-B4-A8-B7-A3-A7-B6-A5-B8-A2-B3-A4-B1-B5
g) A1-B2-A6-A2-B3-A4-B1-A7-B6-A5-B8-B4-A8-B7-A3-B5
h) A1-B4-A3-B2-A8-B5-A6-B7-B3-A7-B8-A4-B6-A2-B1-A5
i) A1-B4-B8-A4-B6-A2-B1-A5-B3-A7-A3-B2-A8-B5-A6-B7
j) A1-B4-A3-B2-B6-A2-B1-A5-B3-A7-B8-A4-A8-B5-A6-B7
k) A1-B2-A6-B5-A8-A5-B1-A7-B6-A4-B8-A2-B3-B7-A3-B4
l) A1-B2-A6-B5-A8-B7-A3-A7-B6-A4-B8-A2-B3-A5-B1-B4
m) A1-B2-A6-A2-B3-A5-B1-A7-B6-A4-B8-B5-A8-B7-A3-B4
n) A1-B5-A3-B2-A8-B4-A6-B7-B3-A7-B8-A5-B6-A2-B1-A4
o) A1-B5-B8-A5-B6-A2-B1-A4-B3-A7-A3-B2-A8-B4-A6-B7
p) A1-B5-A3-B2-B6-A2-B1-A4-B3-A7-B8-A5-A8-B4-A6-B7.

21 Claims, 10 Drawing Sheets

(51) Int. Cl.
  F16C 3/04        (2006.01)
  F16F 9/12        (2006.01)
  F16F 15/30       (2006.01)
  F02B 75/18       (2006.01)
(52) U.S. Cl.
  CPC ........ F16F 15/30 (2013.01); *F02B 2075/027* (2013.01); *F02B 2075/1864* (2013.01)
(58) Field of Classification Search
  USPC ...................... 123/54.4, 54.8, 55.7
  See application file for complete search history.

(56) References Cited

U.S. PATENT DOCUMENTS

| | | | |
|---|---|---|---|
| 3,978,828 A * | 9/1976 | Weber ............... | F02B 75/22 123/54.7 |
| 6,092,016 A | 7/2000 | Sarangapani et al. | |
| 6,675,639 B1 | 1/2004 | Schricker et al. | |
| 7,979,193 B2 * | 7/2011 | Harbert ............... | F02D 41/0087 123/54.8 |
| 2003/0236609 A1 * | 12/2003 | Daniel ............... | F02B 75/22 701/102 |
| 2009/0099755 A1 | 4/2009 | Harbert | |
| 2015/0354471 A1 * | 12/2015 | Kopecek ............... | F02P 5/145 123/406.2 |
| 2017/0191410 A1 * | 7/2017 | Henninger ............... | F02B 75/02 |

FOREIGN PATENT DOCUMENTS

| | | |
|---|---|---|
| EP | 1793104 A1 | 6/2007 |
| EP | 2952712 A1 | 12/2015 |
| GB | 322161 A | 11/1929 |
| GB | 544804 A | 4/1942 |

OTHER PUBLICATIONS

Nestoriedes, E., "A Handbook on Torsional Vibration," Chapter 2, Part 2, Available as Early as Jan. 1, 1958, Cambridge at the University Press, London, England, 21 pages.

Ronnedal, P. et al., "Firing Order Selection in Relation to Vibration Aspects," Proceedings of the 2003 Spring Technical Conference of the ASME Internal Combustion Engine Division (ICES03), May 11, 2003, Salzburg, Austria, 11 pages.

Knorr, J. et al., "Firing Order Optimization Based on Integrated Simulation," MAN Nutzfahrzeuge AG Powerpoint Presentation, Available Online at https://www.gtisoft.com/wp-content/uploads/publication/MAN2010.pdf, Oct. 25, 2010, 22 pages.

Buczek, K. et al., "Firing Order Optimization in FEV Virtual Engine," Proceedings of the 2014 Torsional Vibration Symposium, May 23, 2014, Salzburg, Austria, 8 pages.

Henninger, C., "Firing Sequence Optimization for a V20 Cylinder Diesel Engine," Proceedings of the 2014 Torsional Vibration Symposium, May 23, 2014, Salzburg, Austria, 8 pages.

Priestner, C. et al., "Crank Train Torsional Vibration Optimization," Proceedings of the 2014 Torsional Vibration Symposium, May 23, 2014, Salzburg, Austria, 8 pages.

Henninger, C., "Firing Sequence Optimisation on a V20," MTZ Industrial Special Edition, vol. 4, No. 2, Sep. 2014, Published Online Aug. 23, 2014, 6 pages.

Stadelmann, M. et al., "Generalized Torsional Vibration Analysis of Generating Sets for Diesel-Electric Powertrains," Proceedings of SIMPEP Kongress 2014, Sep. 17, 2014, Germany, 13 pages.

Henninger, C., "Four-Stroke Reciprocating Piston Engine in a V Configuration Having 20 Cylinders," U.S. Appl. No. 15/397,625, Filed Jan. 3, 2017, 41 pages.

* cited by examiner

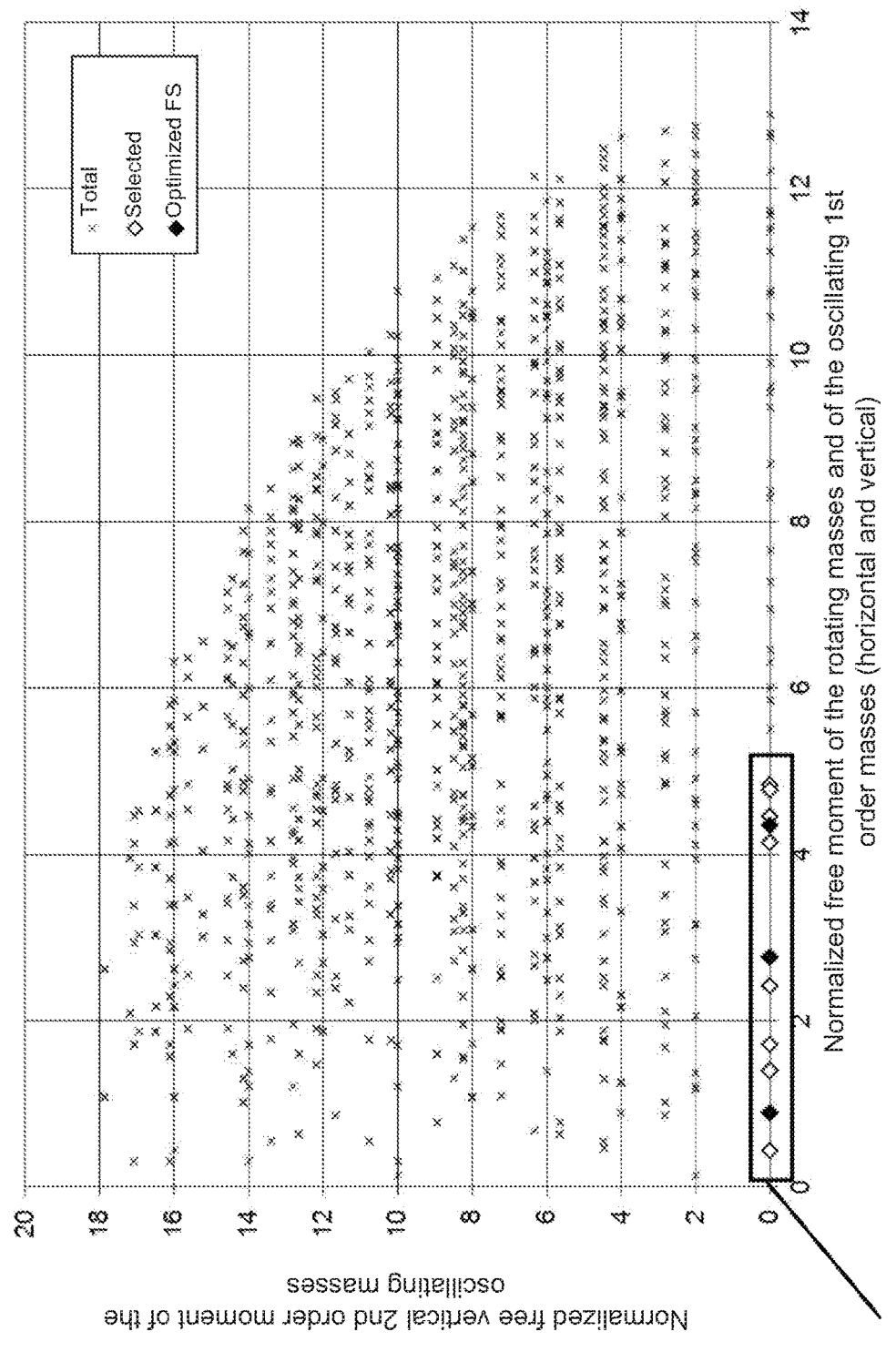

Fig. 9
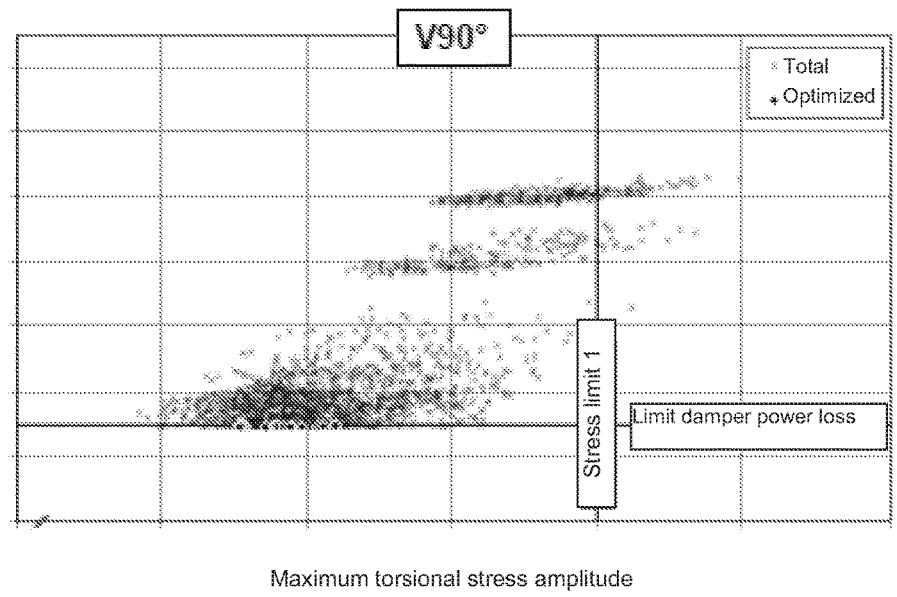
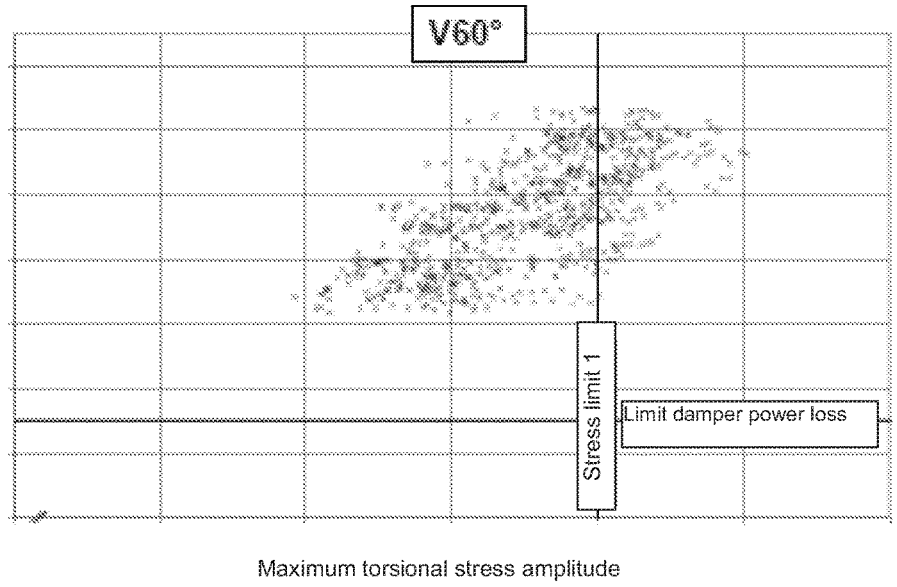

FOUR-STROKE RECIPROCATING PISTON ENGINE IN A V CONFIGURATION HAVING 16 CYLINDERS

CROSS REFERENCE TO RELATED APPLICATION

This application claims priority to Swiss Patent Application No. 00005/16, entitled "Four-stroke Reciprocating Piston Engine in a V Configuration having 16 Cylinders," filed Jan. 4, 2016. The entire contents of which is hereby incorporated by reference in its entirety for all purposes.

TECHNICAL FIELD

The present disclosure relates to a four-stroke reciprocating piston engine in a V configuration having 16 cylinders. In four-stroke reciprocating piston engines in V configuration, the cylinders are arranged in two cylinder banks which are at a V angle to one another.

BACKGROUND AND SUMMARY

The selection of a suitable firing sequence and of a suitable crank star is of fundamental importance in the development of four-cylinder reciprocating piston engines since they decisively determine the mechanical and thermodynamic properties of the engine. The torsional dynamics of the crankshaft, which depend to a substantial extent on the firing sequence must be named in first place here [Wil1935; Nes1958]. In addition, further aspects have to be taken into account such as the gas exchange process, the load on the crankshaft bearing as well as engine operating vibrations. The number of possible firing sequences or possible crank configurations has already been largely described in the relevant literature for reciprocating piston engines having a small number of cylinders with up to six cylinders for reciprocating piston engines in an inline configuration or with up to 12 cylinders in the case of a V configuration, see e.g. [MaaKli1981]. As the number of cylinders increases, the number of possible combinations of firing sequences or crank stars grows disproportionately, however, while the vibration dynamics of the crankshaft and of the total reciprocating piston engine become much more complex at the same time. The selection of a suitable firing sequence for multi-cylinder reciprocating piston engines therefore requires a deep understanding of both the mechanics and the vibration dynamics as well as of the gas exchange process. The systematic evaluation today takes place more and more using computer-assisted simulation and optimizing methods [KnoMal2010, Hen2014a, Hen2014b, BucLau2014, PriOva2014].

There are already a number of patents on firing sequences. U.S. Pat. No. 2,740,389 in this respect deals with the effects of firing sequences on the air path in internal combustion engines having a plurality of cylinders. U.S. Pat. No. 7,979,193 deals with the firing sequences of a V12 reciprocating piston engine in a V 90° configuration. EP 1 793 104 B9 shows a number of advantageous firing sequences for a 15-cylinder reciprocating piston engine in an inline configuration. There is in contrast not yet any knowledge with respect to a V16 engine.

It is therefore the object of the present disclosure to provide a four-stroke reciprocating piston engine in a V configuration having 16 cylinders which has good properties with respect to the above-named factors.

[V1] In a first aspect, the present disclosure deals with optimized firing sequences for a four-stroke reciprocating piston engine in a V configuration having 16 cylinders. Since the optimum firing sequences depend on the direction of rotation of the four-stroke reciprocating piston engine, this first aspect comprises two variations.

In a first variant of the first aspect, the present disclosure comprises a four-stroke reciprocating piston engine in a V configuration having 16 cylinders with a counter-clockwise direction of rotation. The four-stroke reciprocating piston engine has an ignition timing control which ignites cylinders A1 to A8 and B1 to B8 of the four-stroke reciprocating piston engine in one of the following firing sequences, with the direction of rotation and the cylinder numbering being defined by DIN ISO 1204:

a. A1-B2-A5-B4-A7-B8-A3-A8-B5-A6-B7-A2-B3-A4-B1-B6 b. A1-B2-A5-A2-B3-A4-B1-A8-B5-A6-B7-B4-A7-B8-A3-B6 c. A1-B4-A3-B2-A7-B6-A5-B8-B3-A8-B7-A4-B5-A2-B1-A6 d. A1-B4-A3-B2-B5-A2-B1-A6-B3-A8-B7-A4-A7-B6-A5-B8 e. A1-B2-A6-B4-A8-A4-B1-A7-B6-A5-B8-A2-B3-B7-A3-B5 f. A1-B2-A6-B4-A8-B7-A3-A7-B6-A5-B8-A2-B3-A4-B1-B5 g. A1-B2-A6-A2-B3-A4-B1-A7-B6-A5-B8-B4-A8-B7-A3-B5 h. A1-B4-A3-B2-A8-B5-A6-B7-B3-A7-B8-A4-B6-A2-B1-A5 i. A1-B4-B8-A4-B6-A2-B1-A5-B3-A7-A3-B2-A8-B5-A6-B7 j. A1-B4-A3-B2-B6-A2-B1-A5-B3-A7-B8-A4-A8-B5-A6-B7 k. A1-B2-A6-B5-A8-A5-B1-A7-B6-A4-B8-A2-B3-B7-A3-B4 l. A1-B2-A6-B5-A8-B7-A3-A7-B6-A4-B8-A2-B3-A5-B1-B4 m. A1-B2-A6-A2-B3-A5-B1-A7-B6-A4-B8-B5-A8-B7-A3-B4 n. A1-B5-A3-B2-A8-B4-A6-B7-B3-A7-B8-A5-B6-A2-B1-A4 o. A1-B5-B8-A5-B6-A2-B1-A4-B3-A7-A3-B2-A8-B4-A6-B7 p. A1-B5-A3-B2-B6-A2-B1-A4-B3-A7-B8-A5-A8-B4-A6-B7.

Firing sequences a) to j) are advantageous; particular advantages can be achieved by firing sequences a) to d).

In a second variant of the first aspect, the present disclosure comprises a four-stroke reciprocating piston engine in a V configuration having 16 cylinders with a clockwise direction of rotation. The four-stroke reciprocating piston engine has an ignition timing control which ignites cylinders A1 to A8 and B1 to B8 of the four-stroke reciprocating piston engine in one of the following firing sequences, with the direction of rotation and the cylinder numbering being defined by DIN ISO 1204:

a. A1-A6-B1-A2-B5-A4-B7-A8-B3-B8-A5-B6-A7-B2-A3-B4 b. A1-B8-A5-B6-A7-A4-B7-A8-B3-A6-B1-A2-B5-B2-A3-B4 c. A1-B6-B1-A4-B3-A2-B7-A6-B5-A8-A3-B8-A7-B4-A5-B2 d. A1-B6-A3-B8-A7-B4-B7-A6-B5-A8-B1-A4-B3-A2-A5-B2 e. A1-B7-A6-B5-A8-B2-A3-A7-B3-A5-B1-A2-B6-A4-B8-B4 f. A1-A5-B1-A2-B6-A4-B8-A7-B3-B7-A6-B5-A8-B2-A3-B4 g. A1-B7-A6-B5-A8-A4-B8-A7-B3-A5-B1-A2-B6-B2-A3-B4 h. A1-B5-B1-A4-B3-A2-B8-A5-B6-A7-A3-B7-A8-B4-A6-B2 i. A1-B5-A3-B7-B3-A2-B8-A5-B6-A7-B1-A4-A8-B4-A6-B2 j. A1-B5-A3-B7-A8-B4-B8-A5-B6-A7-B1-A4-B3-A2-A6-B2 k. A1-B7-A6-B4-A8-B2-A3-A7-B3-A4-B1-A2-B6-A5-B8-B5 l. A1-A4-B1-A2-B6-A5-B8-A7-B3-B7-A6-B4-A8-B2-A3-B5 m. A1-B7-A6-B4-A8-A5-B8-A7-B3-A4-B1-A2-B6-B2-A3-B5 n. A1-B4-B1-A5-B3-A2-B8-A4-B6-A7-A3-B7-A8-B5-A6-B2 o. A1-B4-A3-B7-B3-A2-B8-A4-B6-A7-B1-A5-A8-B5-A6-B2 p. A1-B4-A3-B7-A8-B5-B8-A4-B6-A7-B1-A5-B3-A2-A6-B2.

Firing sequences a) to j) are advantageous; particular advantages can be achieved by firing sequences a) to d).

The inventors of the present disclosure have in this respect recognized on the basis of a computer-assisted simulation and optimizing method and by a systematic evaluation of the mechanics, vibration dynamics and gas exchange process relevant to the selection of a suitable firing sequence for V16 reciprocating piston engines that the firing sequences claimed in accordance with the present disclosure for four-stroke reciprocating piston engines in a V configuration having 16 cylinders have particularly advantageous properties with respect to torsional vibrations of the crankshaft, the gas exchange process, the load on the crankshaft bearing and the operating vibrations.

The fatigue strength and thus the service life of the engine are increased by the reduced load on the crankshaft and on the crankshaft bearing as well as by the reduction in operating vibrations. The construction effort for the engine and the connection to further components can furthermore be reduced. The small torsion load on the crankshaft due to the optimized firing sequences can furthermore make it possible to make use of inexpensive crankshaft materials. The reduction in the torsional vibrations can furthermore permit the use of a compact torsional vibration damper of a simple design. Both represent a substantial cost advantage in mass production. The engines in accordance with the present disclosure can in this respect be used for the most varied areas of use.

The four-stroke reciprocating piston engines in a V configuration having 16 cylinders in accordance with the present disclosure, both those with an antic-clockwise direction of rotation and a clockwise direction of rotation, optionally have a crankshaft and a flywheel arranged on the crankshaft.

The crankshaft may have cranks at which the connecting rods of the cylinders engage, with the connecting rods of a V segment of the four-stroke reciprocating piston engine each engaging at a common crank. The cranks of the crankshaft in this respect form a so-called crank star.

In a possible embodiment of the present disclosure, the cranks have the following sequence in the direction of rotation, viewed from the flywheel side, with the cranks being numbered in order by C1 to C8 starting from the flywheel side:

i) C1-C8-C3-C4-C7-C2-C5-C6 v) C1-C7-C3-C5-C8-C2-C6-C4.

A four-stroke reciprocating piston engine in a V configuration having 16 cylinders having one of the two listed crank stars is known as such from the prior art. The use of a firing sequence in accordance with the present disclosure with such a crank star is, however, not known.

The following combinations of crank star and firing sequence may be used in this respect:

Crank star i), one of the firing sequences a, b.

Crank star v), one of the firing sequences k, l, m.

In a second aspect of the present disclosure which can also be used independently of the first aspect, the present disclosure deals generally with the configuration of the crank star of the four-stroke reciprocating piston engine, i.e. with the arrangement of the cranks along the crankshaft.

The present disclosure therefore comprises in a second aspect a four-stroke reciprocating piston engine in a V configuration having 16 cylinders, wherein the direction of rotation can be directed both counter-clockwise and clockwise. The engine has a crankshaft and a flywheel arranged on the crankshaft. The crankshaft has cranks at which the connecting rods of the cylinders engage, with the connecting rods of a V segment of the four-stroke reciprocating piston engine each engaging at a common crank. The cranks of the crankshaft in this respect form a so-called crank star. In accordance with the present disclosure, the cranks have one of the following sequences in the direction of rotation, viewed from the flywheel side, with the cranks being numbered in order by C1 to C8 starting from the flywheel side ii) C1-C6-C5-C2-C7-C4-C3-C8 iii) C1-C7-C3-C4-C8-C2-C6-C5 iv) C1-C5-C6-C2-C8-C4-C3-C7 vi) C1-C4-C6-C2-C8-C5-C3-C7.

Four-stroke reciprocating piston engine in a V configuration having 16 cylinders having such crank stars are not known from the prior art. The inventors of the present disclosure have taken into account in this respect that the design of the crank star and in particular the order of the individual cranks along the crankshaft also have a substantial influence on the vibration dynamics of the crankshaft and of the engine. The inventors have in this respect determined, on the basis of a computer-assisted simulation and optimizing method and by a systematic evaluation of the mechanics and vibration dynamics relevant to the selection of a suitable crank star, those crank stars which have particularly good properties with respect to the vibration properties.

The optimized firing sequences in accordance with the first aspect and the optimized crank stars in accordance with the second aspect are in this respect protected independently of one another as subjects of the present disclosure.

A combination of the first and second aspects particularly takes place, however. In this respect, four-stroke reciprocating piston engines are optionally operated with a crank star configured in accordance with the second aspect and with a firing sequence in accordance with the first aspect—

One of the following combinations of crank star and firing sequence is particularly used in this respect:

Crank star i), one of the firing sequences a, b

Crank star ii), one of the firing sequences c, d

Crank star iii), one of the firing sequences e, f, g

Crank star iv), one of the firing sequences h, i, j

Crank star v), one of the firing sequences k, l, m,

Crank star vi) one of the firing sequences n, o, p

The inventors of the present disclosure have recognized in this respect that particularly good results can be achieved by such a coordination of the crank star and firing sequence.

Embodiments of the present disclosure which can be used both with a four-stroke reciprocating piston engine in accordance with the first aspect and with a four-stroke reciprocating piston engine in accordance with the second aspect and with a combination of these aspects will be explained in more detail in the following.

Within the framework of the present disclosure, the V angle of the four-stroke reciprocating piston engine can amount to between 67.5° and 112.5°. The inventors of the present disclosure have recognized in this respect that the V angle also has an influence on the above-named aspects to be optimized. There is furthermore a certain interaction between the firing sequences or crank stars and the V angle.

The V angle in this respect may amount to between 80° and 100°, further optionally between 85° and 95°, further optionally between 87° and 92°, and further optionally between 89° and 91°. The V angle in this respect particularly amounts to 90° C. The inventors of the present disclosure have recognized in this respect that with a V angle of 90°, a particularly favorable arrangement for the vibration dynamics and smooth running of the engine is present. The firing sequences and crank stars in accordance with the present disclosure further produce particularly good results here. Certain deviations of the V angle from this optimum value are possible, however.

The present disclosure is particularly used with firing sequences and crank stars which are configured as equidistant or at least quasi-equidistant. This in turn has advantages for the smooth running, the vibration dynamics and the stresses.

The firing sequences in this respect may have an equidistant or quasi-equidistant firing sequence. In this respect, quasi-equidistant means that the firing sequence is admittedly substantially equidistant, but certain deviations from an equidistant firing interval are permitted. The firing interval between two consecutive ignitions in this respect particularly amounts to between 40° and 50° with an equidistant or quasi-equidistant configuration in accordance with the invention. The firing interval further optionally amounts to between 42° and 48°, further optionally between 44° and 46°. The firing interval between two consecutive ignitions furthermore optionally amounts to 45° in this respect so that an equidistant firing interval is present. The firing interval of 45° in this respect results from the fact that each of the sixteen cylinders fires once as part of two revolutions of the four-stroke reciprocating piston engine.

The crankshaft furthermore may have eight cranks at which the connecting rods of the cylinders engage, with the connecting rods of a V segment of the four-stroke reciprocating piston engine each engaging at a common crank. The cranks in this respect form a crank star. Such a configuration of the crankshaft is of advantage from a technical manufacturing aspect in this respect.

A simple crank star may be used in this respect in which none of the cranks have the same angular position.

The cranks in this respect may be distributed equidistantly or quasi-equidistantly. A quasi-equidistant distribution in this respect means that the distribution is substantially equidistant, but certain deviations from an equidistant distribution are permitted. The angular spacing between cranks following one another at an angle in this respect may amount to between 40° and 50°, further optionally between 42° and 48°, further optionally between 44° and 46°, with the equidistant or quasi-distant distribution in accordance with the present disclosure. The angular spacing particularly amounts to 45° so that equidistance is present. In accordance with the present disclosure, the cranks are thus distributed evenly or substantially evenly over the angular range of 360°.

The four-stroke reciprocating piston engine in accordance with the present disclosure may have a torsional vibration damper which damps the torsional vibrations of the crankshaft. The torsional vibrations are reduced by the embodiment of the four-stroke reciprocating piston engine in accordance with the present disclosure so that the required power loss of the torsional vibration damper can be reduced with respect to known four-stroke reciprocating piston engines. The power loss of the torsional vibration damper in this respect may amount to less than 6‰ of the maximum engine power; further optionally to less than 5‰; further optionally to less than 3.5‰; and further optionally to less than 2.5‰ of the maximum engine power. It is additionally possible due to the required power loss of the torsional vibration damper reduced in accordance with the present disclosure to use favorable and technically less complex vibration dampers.

In accordance with the present disclosure, a viscous oil torsional vibration damper can in particular be used in this respect. This is substantially less expensive in comparison with spring leaf dampers. The use of a spring leaf damper is, however, naturally equally possible in accordance with the present disclosure depending on the application purpose.

The four-stroke reciprocating piston engine in accordance with the present disclosure has a crankshaft and a flywheel arranged on the crankshaft. The power take-off in this respect takes place at the side of the flywheel which is typically connected directly or via a coupling to a shaft which drives a consumer. In this respect, the torsional vibration damper is optionally arranged at the free side of the crankshaft disposed opposite the flywheel. The torsional vibration damper is in this respect particularly arranged outside the engine casing.

The loads reduced in accordance with the present disclosure can make it possible in dependence on the application to produce the crankshaft from a less expensive steel. The crankshaft is in this respect may be produced from a ferritic-pearlitic steel with precipitation hardening from hot-working. Such crankshafts are already known from the automotive sector in which the engines, however, are exposed to substantially smaller loads or have to have a substantially smaller service life. The use of such a less expensive steel instead of the otherwise typical heat-treatable steel likewise becomes possible for the V16 engines in accordance with the present disclosure due to the present disclosure.

Four-stroke reciprocating piston engines in accordance with the present disclosure can be used in a plurality of different configurations and dimensions.

In a possible embodiment of the present disclosure, the displacement per cylinder amounts to between 1 l and 10 l, optionally between 1.5 l and 5 l, further optionally between 2 l and 3 l.

The maximum power of the engine per liter displacement amounts to between 10 kW and 80 kW, further optionally between 20 kW and 60 kW.

The engine can furthermore be operable in a speed range which is between 400 and 3000 r.p.m. The engine can in this respect in particular be operable in a speed range between 600 and 2100 r.p.m. The speed range of a specific four-stroke reciprocating piston engine in accordance with the present disclosure actually used for an application can in this respect make up a part range of this speed range.

The engine may have an engine speed control which operates the engine at a desired engine speed. The engine is optionally controlled in this respect such that the engine again reaches the desired engine speed after brief load changes which allow the actual engine speed to deviate from the desired engine speed. In a possible embodiment, the desired engine speed can be kept constant in this respect. The desired engine speed is in this respect in particular constant over time periods which are long with respect to the typical load changes. In accordance with the present disclosure, the engine control can, however, be designed such that the desired engine speed can be adapted to changing engine conditions and/or load conditions. The desired engine speed can in this respect in particular be tracked slowly for the adaptation.

The engine in accordance with the present disclosure can, however, also be operated using any desired other engine control principles.

The design of the four-stroke reciprocating piston engine in accordance with the present disclosure can be combined with a plurality of different design embodiments of the engine.

The engine in accordance with the present disclosure may have separate intake guides and/or exhaust guides for the two cylinder banks. The engine can furthermore have separate intake and/or exhaust systems for the two cylinder banks.

The engine in accordance with the present disclosure can be a gas engine. In this case, the engine is operable with a gaseous fuel such as hydrogen, natural gas, biogas and/or liquefied gas.

Alternatively or additionally, the engine can also be operable with a liquid fuel. The engine can in this respect, for example, be operable with diesel and/or gasoline.

In a possible embodiment, the engine in accordance with the present disclosure can in this respect only be operable with a gaseous fuel or only with a liquid fuel. Alternatively, however, an operation with both a gaseous fuel and with a liquid fuel is also conceivable.

The engine in accordance with the present disclosure can have direct injection. The engine can furthermore have high-pressure injection. These injections are particularly used with an engine which is operable with liquid fuel.

The engine in accordance with the present disclosure can be operable with a diesel combustion engine or with a gasoline combustion engine.

The engine control can furthermore be configured such that the engine works with a homogeneous-charge, stratified-charge and/or an alternative combustion method. In this respect, one or more combustion methods can also optionally be used in dependence on the engine conditions and/or load conditions.

The engine in accordance with the present disclosure can be a naturally aspirated engine. Alternatively, the engine can have a single-stage or multi-stage supercharging. The engine can in this respect in particular have one or more turbochargers and/or compressors.

A four-stroke reciprocating piston engine in accordance with the present disclosure can be used in a plurality of different applications. Some applications will be described in more detail in the following:

The engine in accordance with the present disclosure can be used as a drive in a heavy-duty machine and/or in mining machinery. A use is furthermore conceivable in an earth-moving machine and/or a transport machine and/or a transfer machine. In a possible application, the engine can in this respect drive a generator or a hydraulic pump via which an undercarriage and/or pieces of working equipment of the heavy duty machine and/or mining machinery and/or earth-moving machine and/or transport machine and/or transfer machine are driven. The engine can alternatively drive an undercarriage and/or pieces of working equipment of the heavy duty machine and/or mining machinery and/or earth-moving machine and/or transport machine and/or transfer machine directly or via a transmission which is optionally connected to the engine by means of a mechanical clutch and/or a torque converter.

The use is in this respect conceivable both for mining machinery for underground mining and for mining machinery for strip mining. The heavy duty machine and/or mining machinery can be both a stationary machine and a mobile machine. If it is a mobile machine, at least the undercarriage is optionally driven by the engine in accordance with the present disclosure.

Possible areas of use of an engine in accordance with the present disclosure are in this respect in particular as a drive for a dump truck or excavator.

A further application of the engine in accordance with the present disclosure is as the main drive for a ship. The crankshaft optionally drives the propeller of the ship in this respect. The shaft of the propeller can in this respect be connected to the flywheel of the engine directly or via a clutch and/or a transmission.

A further area of application of the engine in accordance with the present disclosure is as the main drive in heavy military applications. The engine can in this respect in particular be used in an armored vehicle and/or in a rocket carrier and/or in a speedboat and/or in a submarine.

The engine in accordance with the present disclosure can furthermore be used as a main drive in a rail vehicle. The rail vehicle can in particular be operated diesel electrically in this respect. Alternatively, the drive can take place via a transmission which is further optionally connected to the engine by means of a clutch and/or a torque converter.

The engine in accordance with the present disclosure can furthermore be used as a drive in fluid-conveying technology and/or in the oil and gas industry. For example, the engine can in this respect be used as the drive of a pump and/or of an oil and/or gas extraction machine, of an oil and/or gas transporting machine and/or of an oil and/or gas processing machine.

The engine in accordance with the present disclosure can be used for stationary or mobile power generation.

In a possible application, the load can be connected to the crankshaft in a torsionally rigid manner. Alternatively, the load can, however, also be connected to the crankshaft via a torsionally flexible coupling. Such a torsionally flexible coupling absorbs torsional vibrations to a certain extent in this respect and thus reduces the transmission of still present torsional vibrations of the crankshaft to the driven load.

The present disclosure thus in particular protects the use of a four-stroke reciprocating piston engine in accordance with the present disclosure for one of the above-named applications.

The present disclosure furthermore comprises a machine having a four-stroke reciprocating piston engine in accordance with the present disclosure. The four-stroke reciprocating piston engine is in this respect in particular used to drive the machine or a piece of working equipment of the machine. The machine in accordance with the present disclosure can in this respect both be a stationary machine and a mobile machine.

The machine in accordance with the present disclosure is in particular one of the above-named applications. The machine in accordance with the present disclosure can, for example be a heavy duty machine and/or mining machinery and/or an earth-moving machine and/or a transport machine and/or a transfer machine, a ship a rail vehicle, a heavy military machine, a fluid-conveying machine, an oil and/or gas extraction machine, an oil and/or gas transport machine and/or an oil and/or gas processing machine and/or a power generation unit. The machine can in this respect in particular be configured such as was presented in more detail above with respect to the applications in accordance with the present disclosure. The engine in accordance with the present disclosure can be configured such as was presented in more detail above.

The present disclosure furthermore comprises an ignition timing control or software for an ignition timing control for a four-stroke reciprocating piston engine having 16 cylinders. The ignition timing control or the software in this respect implement at least one of the firing sequences indicated above with respect to the first aspect. The ignition timing control can in this respect be an ignition timing control predefined by the construction design of the engine, for example an ignition timing control driven mechanically via a camshaft. Alternatively, however, it can also be an electronically controlled ignition timing control. The ignition timing control or the software in this respect optionally implements an operation of the four-stroke reciprocating piston engine such as was presented in more detail above and/or can be used in a four-stroke reciprocating piston engine which is configured and/or operated such as was presented in more detail above.

The ignition timing control may be an ignition timing controller. The controller may comprise a microprocessor and a memory, the microcontroller executing a program installed in the memory. The controller and/or microprocessor may be adapted to electronically control components of the engine in such a way as to implement one or more of the firing sequences of the present invention. In particular, the controller and/or microprocessor may control electronically controlled fuel injectors and/or valves of the engine in response to sensors such as a crankshaft position sensor.

The present disclosure furthermore comprises a method of operating a four-stroke reciprocating piston engine in a V configuration having 16 cylinders, wherein the cylinders are operated with one of the firing sequences indicated in more detail above with respect to the first aspect. The four-stroke reciprocating piston engine is in this respect optionally configured and/or is operated such as was presented in more detail above.

The present disclosure will now be presented in more detail with reference to embodiments and to drawings.

BRIEF DESCRIPTION OF THE FIGURES

FIG. 5 shows a diagram in which the normalized free first-order horizontal and vertical moments of the rotating masses and of the oscillating masses and the normalized free second order vertical moment of the oscillating masses for all examined crank stars are shown, with the crank stars optimized in accordance with the present disclosure being marked.

FIG. 9 shows top, the diagram already shown in FIG. 7 prepared for an engine having a V angle of 90° and having a simple crank star; and bottom, the same diagram for an engine having a V angle of 60° and a centrally symmetrical crank star.

DETAILED DESCRIPTION

Figure 1:
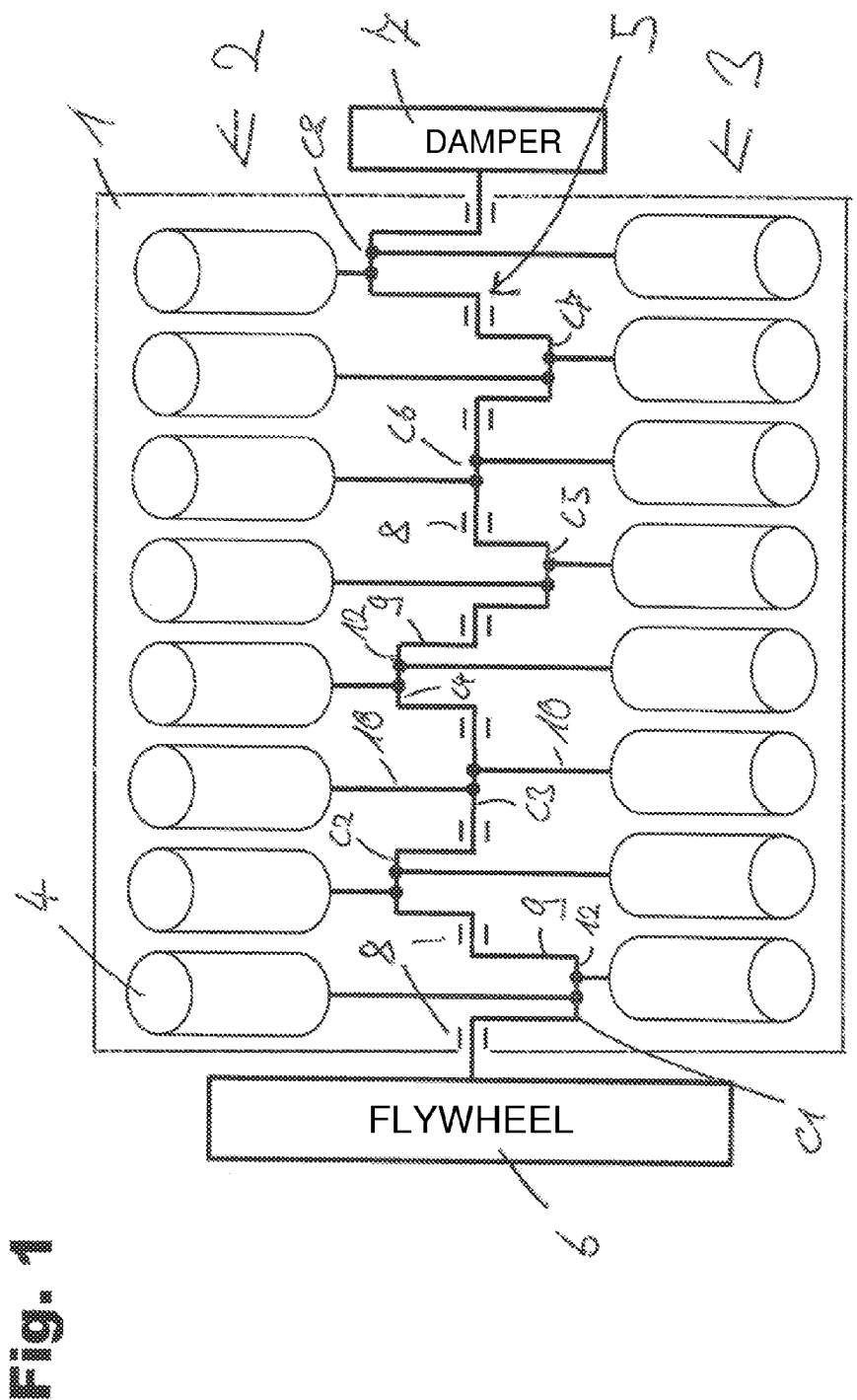
FIG. 1 shows a schematic diagram of a four-stroke reciprocating piston engine in accordance with the present disclosure.
Figure 2:
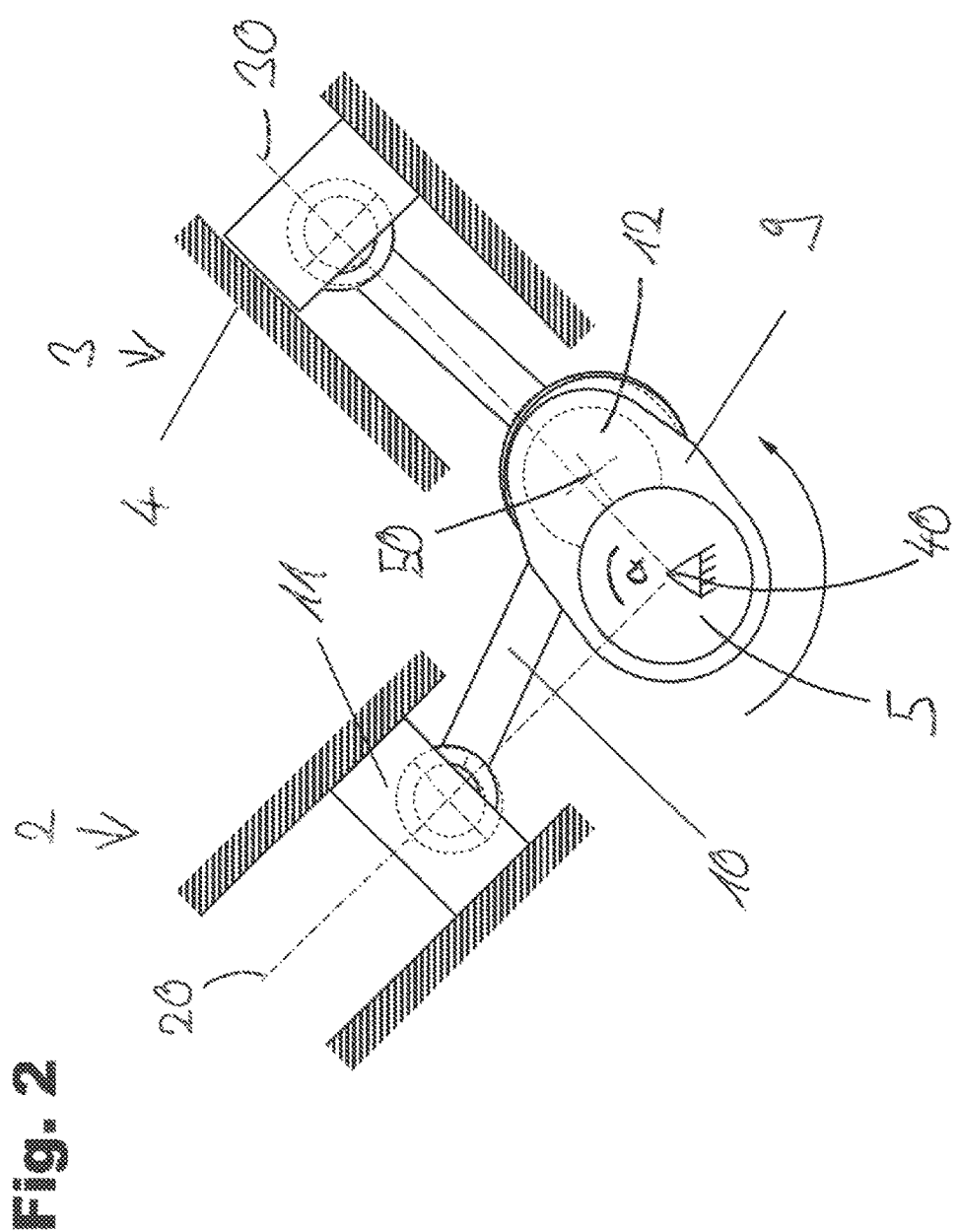
FIG. 2 shows a schematic diagram of a V segment of a four-stroke reciprocating piston engine in accordance with the present disclosure.
Figure 3:
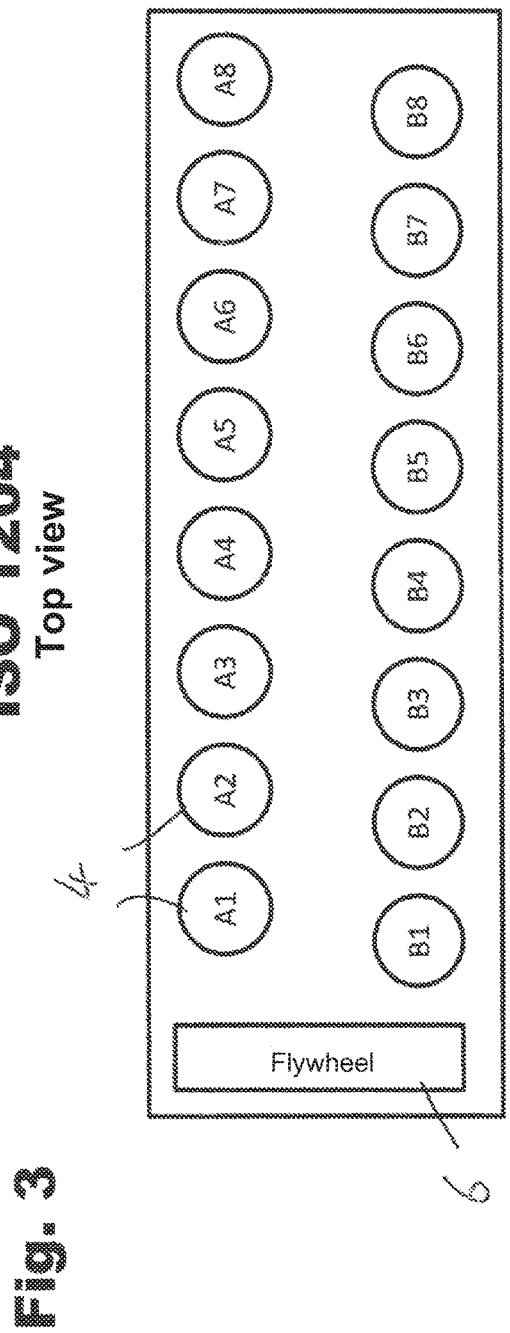
FIG. 3 shows a representation of the cylinder numbering in accordance with DIN ISO 1204, with the engine being shown in a plan view with overhead cylinders and a crankshaft arranged beneath the cylinders.

The design of a four-stroke reciprocating piston engine having 16 cylinders in accordance with the present disclosure is shown schematically in FIGS. 1 to 3.

FIG. 1 in this respect schematically shows the casing 1 of the engine in which the cylinders 4 of the engine are arranged. The crankshaft 5 driven by the cylinders is supported via bearing points 8. In accordance with the V configuration, the cylinders 4 of the engine are arranged in two lines, the so-called cylinder banks 2 and 3.

All cylinders are aligned in parallel with one another within the respective cylinder banks 2 and 3. As can be seen from FIG. 2, the main axes 20 of the cylinders of the first cylinder bank 2 and the main axes 30 of the cylinders of the second cylinder bank 3 are at a V angle α with respect to one another. In the schematic diagram shown in FIG. 2, the center 40 of the crankshaft 5 extends at the point of intersection of the main axes 20 and 30. Alternatively, the center 40 is laterally offset with respect to the plane of symmetry.

The crankshaft in this respect has cranks 9 which form a crank star. The cranks 9 in this respect each have crank pins 12 at which the connecting rods of at least one cylinder engages. It is the task of the individual crankshafts to convert the force applied to the pistons by the gas pressure into a torque which is transmitted as the effective torque via the crankshaft and the flywheel 6 to the power take-off. In modern V engines, the cranks of a V segment typically act on the same crank pins. In the embodiment, the connecting rods 10 of oppositely disposed cylinders, i.e. the connecting rods of a V segment of the V engine, therefore each engage at a common crank or at the crank pin of a common crank. The crank pin can in this respect also be split into two to achieve a certain angular offset.

The crankshaft is supported between two V segments and thus between two consecutive cranks via bearings 8 at the engine casing. The respective crank pins 12 are arranged eccentrically to the axis of rotation 40 of the crankshaft due to the cranks 9 so that the linear movement of the pistons 11 in the cylinders 4 is converted into a rotational movement of the crankshaft 5.

As shown in FIG. 1, the flywheel 6 is arranged at the one end of the crankshaft; a torsional vibration damper 7 is typically arranged at the other free end. The torsional vibration damper 7 can in this respect be a rubber damper or a leaf spring damper in a possible embodiment. The vibration damper may be a viscous oil torsional vibration damper.

The torsional vibration damper 7 is arranged outside the casing 1 in the embodiment. The damper can in particular hereby be cooled by the environmental air. An arrangement of the damper within the casing of the engine is likewise conceivable, in particular when the damper is to be cooled via the engine lubricant. The flywheel 6 is likewise arranged outside the casing 1.

The engine's power take-off is typically carried out at the flywheel 6. The flywheel is in this respect as a rule in particular screwed via a coupling to a shaft which drives a load driven by the engine. Internal engine outputs can be provided at the free end of the crankshaft disposed opposite the flywheel, for example a wheel drive or belt drive to drive a water pump and/or an oil pump etc. In addition, however, power can also be taken for the application at the front crankshaft end.

The nomenclature used in accordance with the present disclosure to designate the individual cranks 9 is drawn in FIG. 1, according to which the cranks are numbered in order starting from the flywheel side by C1 to C8. The numbering of the individual cylinders in accordance with DIN ISO 1204 is reproduced in FIG. 3, as is used in the present case to designate the firing sequences. The drawing in this respect shows the four-stroke reciprocating piston engine in a plan view from above, with the flywheel 6 and the cylinders 4 being drawn. The crankshaft is in this case located beneath the cylinders. The direction of rotation is in this respect defined in the present case in accordance with DIN ISO 1204 in a view from the power output side of the engine to the crankshaft, i.e. looking from the flywheel side of the engine to the crankshaft.

In accordance with the present disclosure, optimized firing sequences for the cylinders of a reciprocating piston engine in accordance with the present disclosure were determined in this respect. Reference is in this respect made to the preceding representation with regard to the specific firing sequences. The nomenclature used in FIG. 3 in accordance with DIN ISO 1204 was in this respect used to designate the cylinders.

Figure 4A:
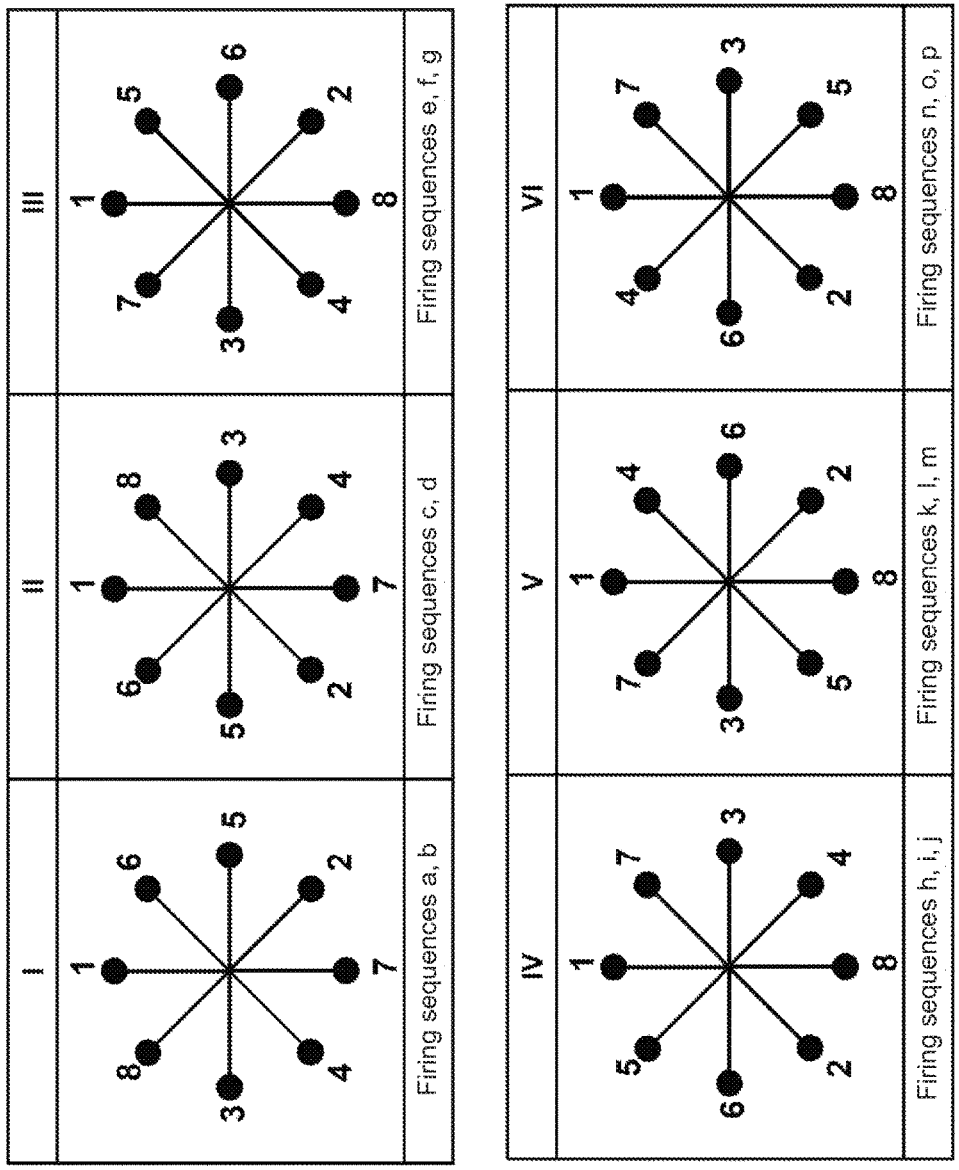
FIG. 4A shows crank stars in accordance with the present disclosure for a four-stroke reciprocating piston engine with a counter-clockwise direction of rotation in a representation looking from the flywheel side to the crankshaft, with the numbering of the cranks on the flywheel side starting at 1, as well as firing sequences with respect to these crank stars.
Figure 4B:
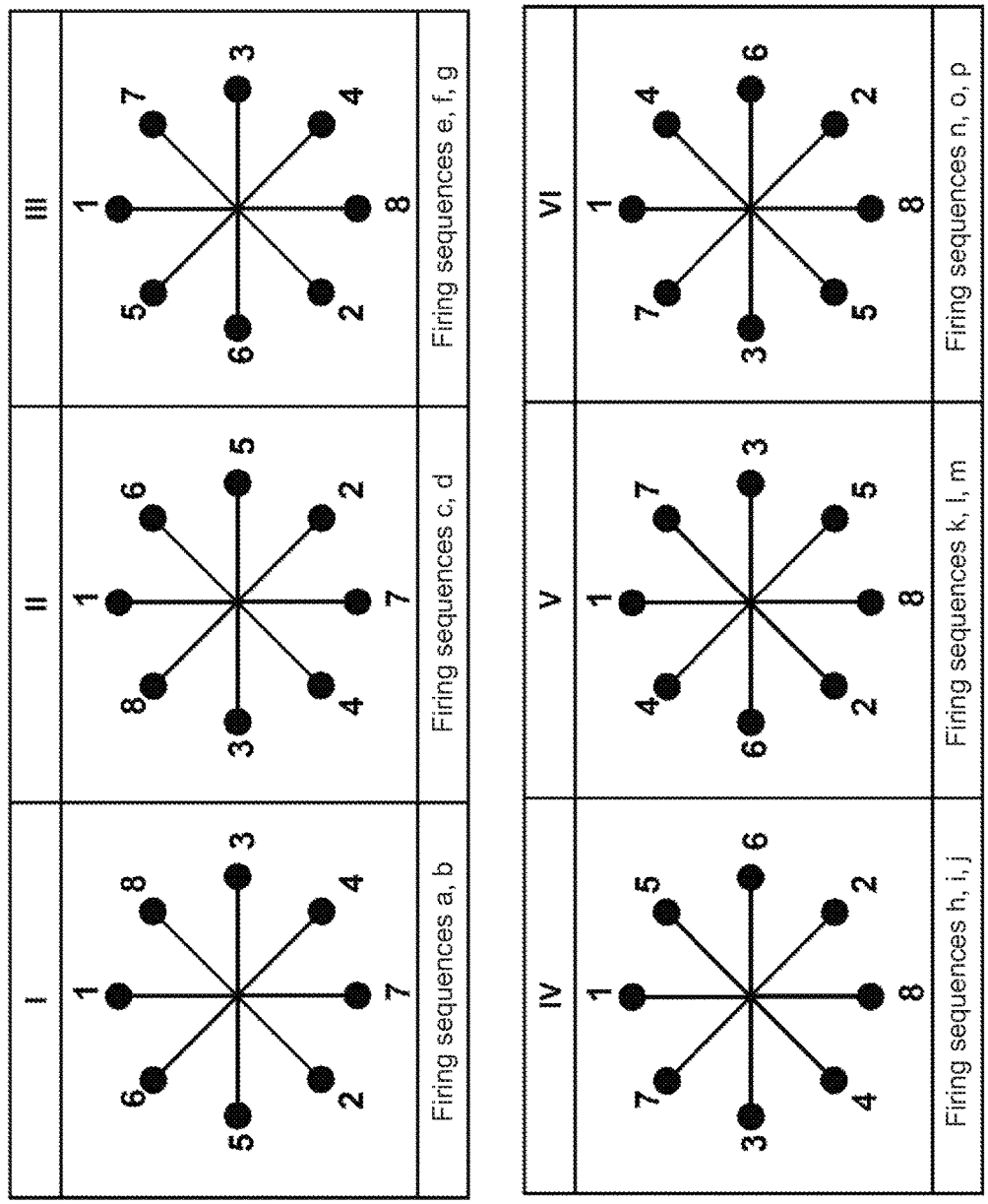
FIG. 4B shows crank stars in accordance with the present disclosure for a four-stroke reciprocating piston engine with a clockwise direction of rotation in a representation looking from the flywheel side to the crankshaft, with the numbering of the cranks on the flywheel side starting at 1, as well as firing sequences with respect to these crank stars.

The optimized crank stars selected in accordance with the present disclosure which have likewise already been described are shown in more detail in FIG. 4A for engines with a counter-clockwise direction of rotation and in FIG. 4B for engines with a clockwise direction of rotation. The crank stars for the engines having the two different directions of rotation have the same sequence of cranks in this respect with regard to the direction of rotation. In this respect, the view from the flywheel side onto the crankshaft along the crankshaft axis is respectively shown in the Figures. The cranks are furthermore indicated in accordance with the nomenclature shown in FIG. 1, with here only the letter "C" having been omitted and the cranks having been numbered in order starting at 1 on the flywheel side, i.e. the cranks 1 to 8 shown in FIGS. 4A and 4B correspond to the cranks C1 to C8.

In the embodiment, the individual cranks are in this respect arranged equidistantly, i.e. cranks following one another in the angle of rotation each have an angle of rotation spacing of 45°. The present disclosure is, however, not restricted to such an equidistant arrangement. The arrangement is, however, optionally at least quasi-equidistant. The crank star is in this respect a simple crank star, i.e. no cranks having the same angular position are used. In the embodiment, all the cranks are in this respect distributed evenly around the axis of rotation.

It will now be described in more detail in the following how the parameters of the four-stroke reciprocating piston engine in accordance with the present disclosure and in particular the firing sequences and the crank stars were determined. In this respect, in the embodiment, a combination of the first and second aspects of the present disclosure is present.

Fundamental Aspects of the Optimization

In reciprocating piston engines, the crankshaft is subject to different loads. The bending load of the individual cranks must be named first which arises through the cylinder pressure and the accelerated masses of the individual crank drives. In addition, the crankshaft is subject to a time-variable torsional load which results from the torques of the individual crank drives. In addition to these quasi-static types of load, torsional vibrations are excited in the crankshaft by the transient development of the torques of the individual crankshaft drives and said torsional vibrations can exceed the quasi-static torsional load by a multiple.

In addition to various torsionally dynamic criteria, still further aspects are to be taken into account in the selection of the V angle, of the crank star and of a suitable firing sequence. The crankshaft mass balancing, the gas exchange process, the load on the crankshaft bearings and the operating vibrations of the total reciprocating piston engine must be named here. For common crank train configurations such as inline six-cylinder engines or V12 reciprocating piston engines, the number of possible crank stars and firing sequences is still relatively clear and the firing sequences which can be meaningfully implemented are comprehensively described in the literature. The number of possible firing sequences generally increases, however, highly disproportionately to the number of cylinders, which makes the selection of an advantageous solution substantially more difficult. The number of possible firing sequence combinations is already in the order of magnitude of $10^5$ for the four-stroke reciprocating piston engines dealt with here. In addition the use of optimization algorithms is made more difficult in that the optimization parameter firing sequence is of a discrete nature and the correlation between the firing sequence and some evaluation criteria such as bearing load and gas cycle dynamics has large discontinuities.

The number of criteria to be considered in combination with the large number of possible firing sequences requires the use of methods of multi-criteria optimization. The discrete and partially discontinuous nature of the optimization problem in this respect prevents the use of purely deterministic optimization algorithms. A comprehensive evaluation can, in contrast, be achieved by a complete assessment of the criteria for all solutions ("design of experiments"). The calculation effort can in this respect be reduced to a reasonable level by a hierarchical optimization approach.

V Angle and Fundamental Crankshaft Topology

Different aspects play a role in the selection of the V angle of crankshaft drives. First, the V angle decisively determines the height and the width of the engine's design. The firing intervals of the engine are furthermore fixed by the V angle if split pin cranks are not provided. The latter in turn have a substantial influence on the both the rotational irregularity of the flywheel and the torsional dynamics of the crankshaft. Furthermore, the forces in the crankshaft bearing are equally dependent on the V angle since it defines the directions of the cylinder forces and, via the firing interval, the degree of the superposition of the single forces in a bearing.

It is of advantage for the development of a robust engine with a moderate torsional stress on the crankshaft to select a crank train configuration which is adapted to the number of cylinders used and which has an equidistant firing interval. The selected crankshaft topology plays an important role here in addition to the V angle. In modern, fast-running four-stroke reciprocating piston engines, the connecting rods of a V segment typically run on a common crank pin. Two topologies must generally be distinguished with respect to the arrangement of the crank pins along the crankshaft, the so-called crank star. With the so-called simple crank star, the crank pins are distributed evenly over the angular range of 360° so that a crank star angle of $$\varphi_K = \frac{2 \cdot 360°}{N_z}$$

results, where $N_z$ designates the number of cylinders. $\varphi_K = 45°$ thus results for the V16. An equidistant $\varphi_Z$ results in this case if the V angle $\alpha_V$ is selected at $\alpha_V = k \cdot \varphi_K$, with $k=1,2$ In this case, the firing interval is equal to the crank star angle. Possible V angles of $\alpha_V = 45°$, 90°, and 135° thus result for the V16.

With the so-called double crank star, two respective crank pins lie at the same angular position in the crank star. The so-called centrally symmetrical crankshafts form a special case which can frequently be found in which the cranks along the crankshaft are arranged symmetrical with respect to the crankshaft center. Crank trains provide the advantage from a number of cylinders of 12 or more onward that no free mass forces and moments occur in operation. The following requirement for the crank star angle applies to double crank stars $$\varphi_K = \frac{4 \cdot 360°}{N_z}.$$

$\varphi_K = 90°$ thus results for the V16. An equidistant firing interval $\varphi_Z$ results in this case if the V angle $\alpha_V$ is selected at $$\alpha_V = k \cdot \frac{\varphi_K}{2}, \text{ with } k = 1, 3, 5 \ldots$$

In this case, the firing interval is equal to half the crank star angle. Possible V angles of $\alpha_V = 45°$, and 135° thus result for the V16.

Further restrictions must be noted in the selection of the V angle. Any desired small V angles can thus not be implemented due to the diameter of the cylinder liners since otherwise penetrations would take place. As the V angle increases, in contrast, larger and larger horizontal force components result in the crankshaft bearing, which has to be considered in the bearing design. V angles larger than 120° must be evaluated critically with respect to the horizontal force introduction since there is the danger here that strains which are too large are applied to the separation plane of the bearing shells, which can result in increased wear and failure.

The angles favorable to centrally symmetrical crank stars are therefore technically unfavorable for the V16 due to these considerations.

A V angle of 90° or its surrounding may therefore be used, as is a simple crank star. The advantages which can hereby be achieved will be described in more detail below with respect to FIG. 9. Purely from a combination aspect, 5040 crank stars with a total of 64,512 possible firing sequences result for this configuration.

Selection of the Crank Star Based on the Observation of the Force Effect and Torque Effect of the Accelerated Masses in the Crankshaft Drive Mechanism In reciprocating piston engines, forces and moments occur to a substantial degree which are caused by the accelerated oscillating masses of pistons and connecting rods and by the rotating masses of the connecting rods and the crank-shaft. They can cause substantial vibrations and represent an additional load on the bearings of the crankshaft.

In this respect, the arrangement of the single cranks along the crankshaft, the so-called crank star, plays a central role since it predefines the phase offset between the mass forces of the individual crank drives and thus determines the resulting effect on the total reciprocating piston engine. In addition, the selected crank star determines the number and size of the counter-weights to be attached to the crankshaft. Since they in turn have noteworthy mass inertial torques, there is a direct correlation between the crank star and the vibration characteristics of the crank train.

It is customary to give the force and torque effect of a crank train configuration not in absolute values, but rather normalized with respect to the acting masses, the crank radius, the cylinder spacing, the connecting rod ratio and the square of the angular velocity. Generally valid characteristics thus result which are independent of the respective construction size and rotational speed of the engine.

Due to the non-present symmetry of the simple crank star for the V16, free forces and moments of the accelerated masses can occur to a substantial degree. For the case of a V angle of 90°, the crank train of the V16 has no free mass forces. The free 1st order moments in the horizontal direction and in the vertical direction, which is caused by the oscillating masses, is in this case identical to that of the rotating masses. The free 2nd order moments, which are caused by the oscillating masses, cancel each other out for the horizontal direction, while a resulting free moment remains in the vertical direction. It is thus sufficient for the evaluation of the crank stars to observe the free moment of the rotating masses and the vertical 2nd order moment of the oscillating masses. FIG. 5 shows the normalized free moment of the rotating masses or of the oscillating 1st order masses in the horizontal direction and in the vertical direction as well as the normalized free vertical 2nd order moment of the oscillating masses for all 5040 possible simple crank stars of the V16. All the crank stars which have a vertical 2nd order moment were excluded for the preselection of the crank stars. The 30 crank stars K having the smallest values shown in FIG. 5 were used with respect to the moment of the rotating masses. As shown in the following, those crank stars were determined from the remaining crank stars with respect to which optimized firing sequences are available. These crank stars for which optimized firing sequences exist are separately characterized.

Figure 6:
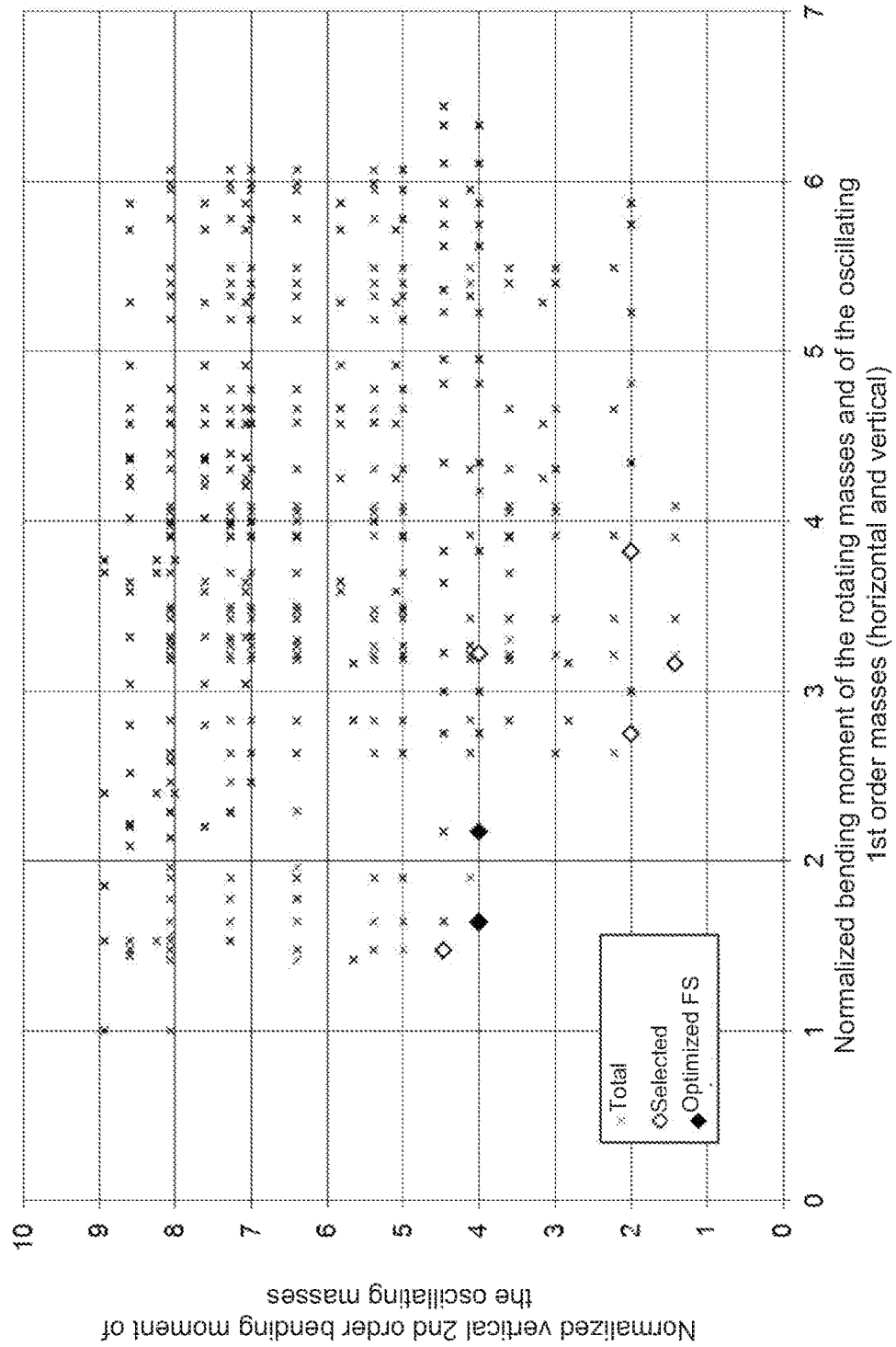
FIG. 6 shows a diagram in which the normalized first-order horizontal and vertical bending moments of the rotating masses and of the oscillating masses and the normalized second order vertical bending moment of the oscillating masses for all examined crank stars are shown, with the crank stars optimized in accordance with the present disclosure being marked.

FIG. 6 shows the corresponding bending moments of the rotating masses or of the oscillating 1st order masses in the horizontal direction and the vertical direction as well as the vertical 2nd order bending moments of the oscillating masses. The selected crank stars and those with optimized firing sequences are emphasized.

Torsional Stress in the Crankshaft and Dissipation in the Torsional Vibration Damper The total crank train of a reciprocating piston engine, consisting of a crankshaft, single cranks, and flywheels, represents a torsional vibration system which is excited to vibrations by the transient torque developments of the individual cylinders. The fundamental dynamic properties of the vibration system can be described by the latter's eigenmodes. The respective excitation of an eigenmode substantially depends on the firing sequence since it determines the respective phase offsets between the torque developments of the individual cylinders.

Every torsion deformation of the crankshaft is necessarily accompanied by corresponding mechanical stresses. In modern high-speed four-stroke reciprocating piston engines, the latter reach unpermitted high values with respect to the fatigue strength of the crankshaft material in the critical regions which typically lie in the transition radii of the main pins and of the crank pins as well as in the oil bore outlets. In order nevertheless to ensure a safe operation, the vibration amplitudes and the torsional stresses caused thereby have to limited to the permitted amount. This is achieved as a rule in that a torsional vibration damper is attached to the side of the crankshaft disposed opposite the flywheel, the free end. In practice, different technical solutions have been established here such as the rubber damper, the viscous oil torsional vibration damper, and the leaf spring damper whose use is associated with increasing costs in the named order.

It must be noted in the optimization of the firing sequence that the torsional vibration damper used in the simulation model can influence the optimization result. It is therefore necessary to include these parameters in the optimization or to at least define them meaningfully as part of a pre-study. In the present case, a viscous oil torsional vibration damper in a simple design was in particular taken into account.

Both the manner of construction and the required size of the damper are decisively determined by the torsional vibrations occurring in engine operation. In addition to the engine size, the power density and the vibration characteristics of the total crank train, the selected firing sequence plays a central role here since it decisively determines the characteristic of the vibration amplitudes in the speed range of the reciprocating piston engine. The required construction size of the damper can be substantially reduced in part by the selection of a firing sequence advantageous in a technical vibration aspect. It is frequently also possible to switch to a simpler damper construction type, e.g. the use of a viscous oil torsional vibration damper instead of a leaf spring damper, which includes substantial cost advantages. Both the construction space required for the damper and the costs of the damper therefore decisively depend on the selection of the firing sequence.

The maximum torsional stress amplitude of a crankshaft which can be withstood in a fatigue-endurable manner substantially depends on the crankshaft material used and on its machining. The selection of a firing sequence which is "compliant" from a technical vibration aspect can occasionally reduce the torsional stresses so much that a less expensive crankshaft material or a simpler machining of the critical zones of the crankshaft can be made use of. Both help to significantly reduce manufacturing costs.

Both the torsional stresses in the crankshaft and the damper power loss depend on the speed of the engine. The total useful application speed range of the engine is therefore looked at for the optimization and the respective maximum value of the respective criterion in the speed range is a basis for the evaluation of a firing sequence.

The torsional dynamics furthermore depend on the inertia at the flywheel side. To cover an application range which is as wide as possible, a heavy-duty application with a large flywheel and a torsionally flexible decoupling of the drivetrain was furthermore looked at such as can be used in a plurality of areas.

A torsional vibration calculation is carried out for the optimization for all firing sequences which are located on the crank stars previously selected with reference to the criterion of the mass forces and mass torques.

Figure 7:
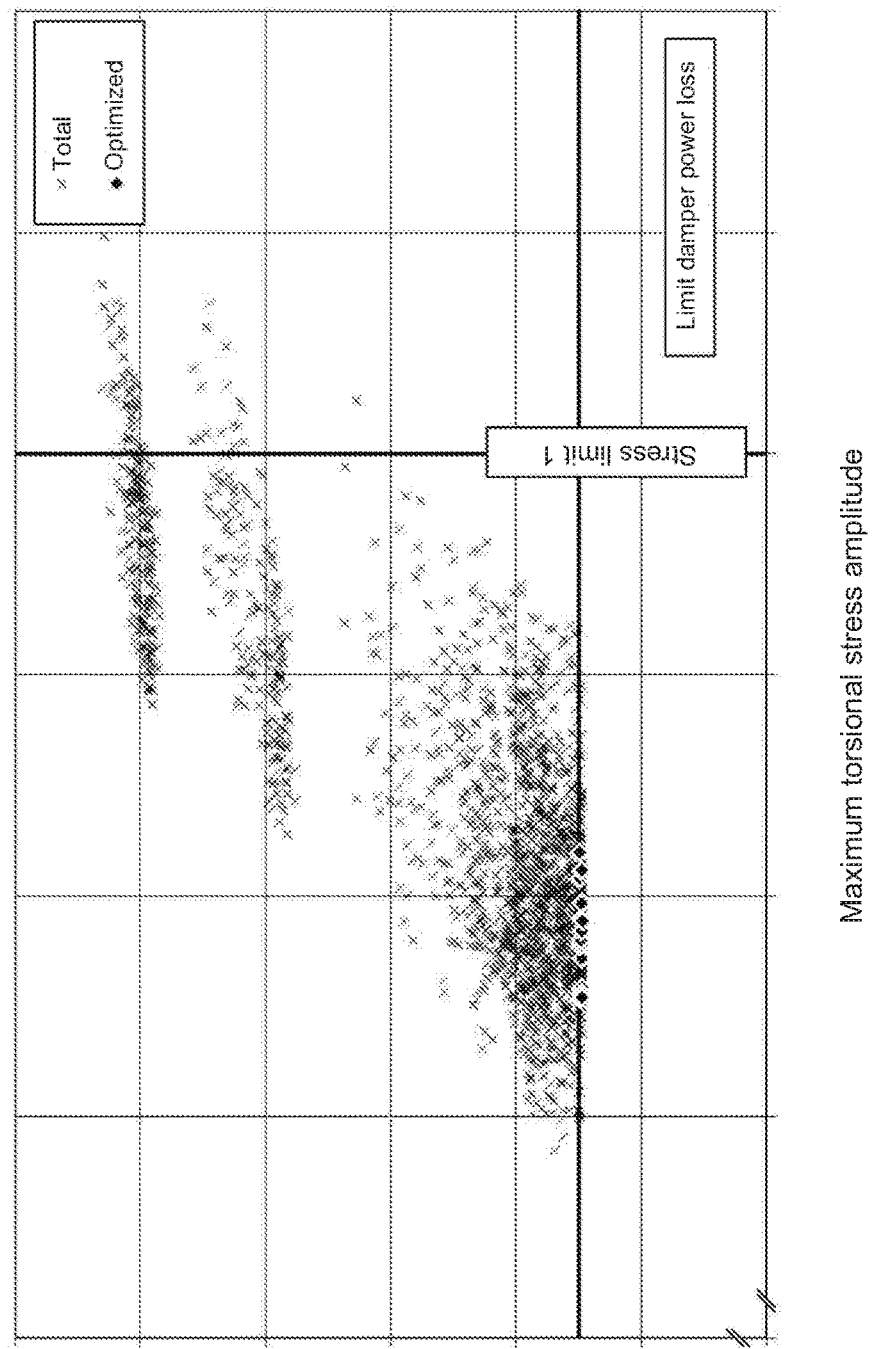
FIG. 7 shows a diagram which represents the maximum torsional stress amplitude and the maximum power loss of the torsional vibration damper on the use of a V16 engine as a drive of a heavy-duty application with a torsionally flexible coupling for all the examined firing sequences, with the firing sequences optimized in accordance with the present disclosure being emphasized; limits for the torsional stress and for the damper power loss are furthermore entered.

3,840 possible firing sequences thus result for the V16 which can be operated with the 30 selected crank stars. FIG. 7 shows by way of example the maximum damper power loss and the maximum torsional stress amplitude in the crankshaft for all the examined firing sequences for a heavy-duty application with torsionally flexible decoupling of the drivetrain. Each cross in the diagram represents a specific firing sequence in this respect. The maximum torsional stress on the crankshaft in the engine speed range occurring due to the torsional vibrations is in this respect applied over the x axis. The maximum power loss is entered over the y axis which has to be led off over the torsional vibration damper due to the torsional vibrations which are present. The values indicated represent the loads for all the examined firing sequences occurring at a maximum over the speed range. The torsional stresses are still so high above the stress limit 1 that typically an expensive heat-treatable steel has to be used. A crankshaft of a less expensive low grade steel material can be used for firing sequences which are below the stress limit 1. It can be recognized that the torsional vibration strain on the crankshaft can be reduced by up to approximately 30% by the selection of a favorable firing sequence.

The indicated limit for the power loss of the torsional vibration damper amounts to approximately 2.5 per thousand of the maximum engine power. This small value allows a compact and inexpensive viscous oil torsional vibration damper to be used. It can be recognized that the thermal load on the torsional vibration damper can be reduced by a factor of up to approximately 3 by the selection of a favorable firing sequence.

On a use of the optimum firing sequences, the torsional vibrations are limited such that, first, the use of a small and inexpensive viscous oil torsional vibration damper is possible instead of a complex and thus expensive spring leaf damper or instead of an extremely large viscous oil torsional vibration damper and, second, a less expensive crankshaft can be used. With comparatively highly limited torsional vibrations, the crankshaft can be produced from lower grade steel such as is often used in the automotive area, instead of from heat-treatable steel.

Vibration Amplitudes at the Flywheel and at the Free Crankshaft End

With reciprocating piston engines with long crankshafts, torsional vibration amplitudes and angle accelerations occur at the free crankshaft end which are substantial in part. This has corresponding effects on gear drives and belt drives of the reciprocating piston engine which are possibly positioned here and which drive different units such as the water pump or the oil pump. When selecting the firing sequence, the torsional dynamics of the free crankshaft end may by no means be left out of consideration. Correspondingly, such firing sequences were determined which are advantageous for a plurality of applications. In addition, the vibration amplitude at the flywheel may not be left out of consideration. This is admittedly anyway moderate in comparison with engines having a small number of cylinders, but can by all means be of significance in the configuration of torsionally elastic elastomer couplings.

Figure 8:
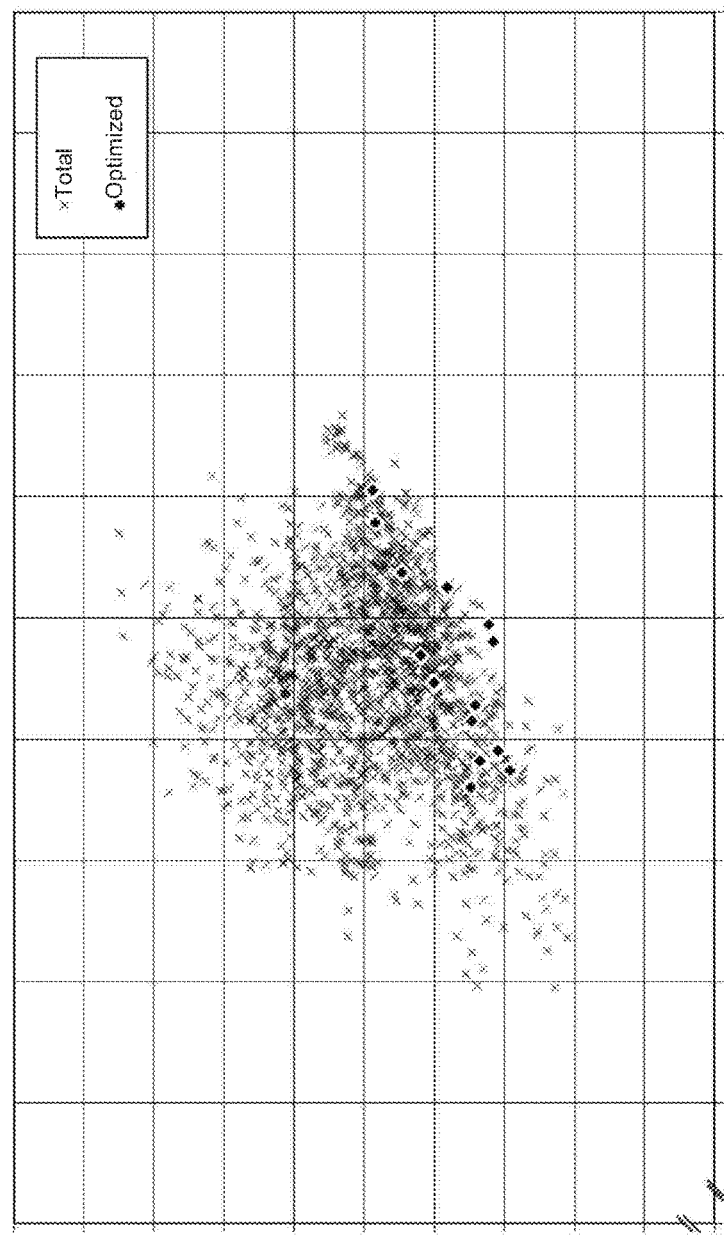
FIG. 8 shows a diagram which represents the vibration amplitudes at the flywheel and at the free crankshaft end on the use of a V16 engine as a drive of a heavy-duty application with a torsionally flexible coupling for all the examined firing sequences, with the firing sequences optimized in accordance with the present disclosure being emphasized.

FIG. 8 shows the vibration amplitudes at the flywheel and at the free crankshaft end for the heavy-duty application. At the flywheel side, the optimized firing sequences are in the middle to upper range of all firing sequences, while they are in the lower middle field with respect to the amplitudes at the free crankshaft end.

Loads on the Crankshaft Support

A variety of aspects have to be taken into account when dimensioning the crankshaft bearings. The underlying loads on the bearing in this respect also depend on the firing sequence in addition to the peak cylinder pressure in a variety of manners. The firing sequence first determines whether and the extent to which the forces of two adjacent cylinders in the interposed common bearing overlap in time and thus partially add up. The mass forces to be taken up by the bearing furthermore depend on the crank star and on the inner mass balancing and are thus indirectly determined by the firing sequence. An additional load on the crankshaft bearings can be caused by the torsion deformation of the crankshaft which is accompanied by a radial transposition of individual main bearing pins. If this occurs in-phase with the firing load of an adjacent cylinder in a bearing, it can result in a substantial amplification of the maximum bearing force. The firing sequence equally plays an important role with respect to the thermal load on the hydrodynamic bearings since the time interval of two consecutive peak loads is defined by it. A large interval between consecutive peak loads makes it possible to flush the bearing sufficiently with lubricant and to cool it. These aspects have to be taken into sufficient account in the selection of a firing sequence.

The number of directly consecutive bearing strains is between two and four for the selected crankshaft drive configuration of the V16. In the selection of the firing sequence, only those firing sequences were taken into account which have a minimal value of two.

Gas Exchange Process

The degree of filling of a cylinder substantially depends on the local pressure conditions in the intake manifold during the intake phase. They in turn depend greatly on the spatial distance of two cylinders in the same intake manifold fired directly after one another. The degree of filling of a cylinder furthermore depends on the local pressure conditions in the exhaust manifold during the emission phase. The situation here is much more complex than at the inlet side since wave propagation effects of the exhaust gas flow can substantially influence the pressure conditions. A well-founded evaluation of the charge cycle interference as a rule requires a simulation of the gas exchange process.

To achieve a degree of filling of the cylinders which is as high and as uniform as possible, it is of advantage to ensure a sufficiently large spatial distance between two cylinders fired after one another at both the intake manifold and at the exhaust manifold. Bank-alternating firing sequences have furthermore proved to be advantageous for reciprocating piston engines in V configuration with separate intake systems and exhaust gas systems at the banks since they have an interval much larger in time between two consecutive inlet procedures in the same intake passage or emission procedure in the same exhaust gas manifold. This reduces interference and thus increases the thermodynamic efficiency of the reciprocating piston engine.

Due to the selected simple crank star, it is not possible with the V16 to define a purely bank-alternating firing sequence. It is unavoidable that two cylinders are fired consecutively at least once on each bank. The maximum number at which this event occurs in a cylinder bank is three. It was demanded in the optimization that the minimal value of one is observed here. The number of cylinders, which lies between two cylinders fired directly after one another on the same bank, varies between one and four for the examined firing sequences. A value of at least two is demanded here to reduce the interference on the charge cycle. A maximum spacing of one cylinder can be achieved with respect to two firings on the same bank between which a firing on the other bank lies. This demand is likewise taken into account in the selection of the firing sequences.

Torsional Dynamics of the Camshaft

In the same way as in the case of the crankshaft, the firing sequence has a substantial influence on the torsional dynamics of the camshaft. The excitation the camshaft undergoes via the control drive thus depends, on the one hand, on the torsional dynamics of the crankshaft. Furthermore, the phase offset of the torque loads on the individual valve drives is equally fixed by the firing sequence according to the function. Depending on the type and size of construction and in dependence on secondary units possibly driven via the camshaft such as the engine coolant pump, substantial vibration amplitudes can occur here. They have to be evaluated in a separate torsional vibration calculation and the design has to take corresponding account of the stresses which occur. The torsional dynamics of the camshaft is, however, not taken into account in the firing sequence optimization since experience has shown here that sufficient design and technical possibilities are present to take account of the torsional stress.

Influence of the Construction Size, the Specific Power and the V Angle of the Engine The fixing to a specific firing sequence does not only fix the sequence with which the individual combustion chambers of the engine are supplied with fuel, but rather also determines the topology of the underlying crankshaft. Conversely, the number of possible firing sequences is already very greatly reduced for an existing crankshaft topology.

There is furthermore a correlation between possible firing sequences and the V angle. The firing sequences with an asymmetric crankshaft listed for the V16 work, viewed kinematically, in a V angle range between 67.5° and 112.5°; the advantageous properties are, however, the strongest at V90° and the direct surrounding. The advantageous properties with respect to strain on the crankshaft bearing and the gas exchange process are largely insensitive with respect to a variation of the V angle. The torsional dynamics of the cranktrain in contrast reacts comparatively sensitively with respect to a variation of the V angle. Angular ranges of approximately ±10° around the optimum V angle are thus advantageous.

This is illustrated by FIG. 9. The diagram known from FIG. 7 is shown there which represents the maximum torsional stress amplitude and the maximum power loss of the torsional vibration damper on the use of a V16 engine having an ideal V angle of 90° as the drive of a heavy-duty application with a torsionally flexible coupling for all the examined firing sequences with a simple crank star. The same diagram is shown for comparison at the bottom for a V16 engine having a non-optimum V angle of 60° and having a centrally symmetrical crank star. As can be seen from FIG. 9, only substantially worse values for the maximum torsional stress and the maximum damper power loss can be achieved at 60° and with a centrally symmetrical crank star than with a V angle of 90° and a simple crank star.

The present study is based on an engine series with a 135 mm bore diameter and 2.25 liters cylinder displacement. The specific power in this respect amounts to 34 kW per liter displacement; the speed range is between 600 and 2100 r.p.m. The effective mass moment of inertia of the total crankshaft drive including the flywheel amounts to approximately 8 kgm$^2$. It is, however, expected that the results maintain their validity over a wide range. It can basically be assumed that the advantageous properties with respect to the torsional dynamics are equally present in a range of displacement from approximately 1 liter to 10 liters, optionally from 1.5 to 5 liters per cylinder.

The present disclosure is not restricted to specific types of construction of a four-stroke reciprocating piston engine. Reciprocating piston engines in accordance with the present disclosure can thus be operated in accordance with a diesel or gasoline internal combustion method. In this respect, both homogeneous and alternative combustion methods are conceivable.

The four-stroke reciprocating piston engines in accordance with the present disclosure can furthermore be operated with any desired fuels. The design in accordance with the present disclosure and the sequences in accordance with the present disclosure are in particular of advantage independently of the fuel selected. For example, the engine can be a gas engine, in particular a gasoline engine which can be operated with a gaseous fuel such a hydrogen, natural gas or liquefied gas. It can, however, also be an engine which is operated with liquid fuels.

The engine can furthermore be a naturally aspirated engine without charge. The present disclosure can, however, equally also be used in engines having a single-stage or multi-stage charge.

The engine can in this respect be connected to the drive either with rotationally stiffness or via a torsionally flexible or torsionally elastic coupling.

Application Possibilities

Four-stroke reciprocating piston engines in accordance with the present disclosure can be used in a variety of different applications.

In the optimization of the firing sequences, the general application "heavy duty" with a torsionally elastically coupled drivetrain was considered. Since this is the case in most industrial applications of the examined power class, this case covers a plurality of the most varied areas of application.

Possible applications include the drive of heavy-duty machines and mining machinery, with a mobile or stationary use also being possible here. Corresponding mining machinery can be usable both in underground mining and in strip mining. They can, for example, be dump trucks or excavators.

A further application possibility is the use as a main drive in a ship.

The engine can furthermore be used as a main drive in a rail vehicle. For example, the engine can in this respect drive an electric generator via which the engines of the rail vehicle can in turn be driven. Alternatively, the drive can also take place via a torque converter and/or a transmission.

The engine in accordance with the present disclosure can furthermore also be used in heavy military applications such as for the drive of armored vehicles, rocket carriers, speedboats and submarines.

The engine can furthermore be used as a drive in the oil and gas industry, in particular for the drive of pumps. A use of the engine as a drive in conveying technology and in particular as a pump drive is also conceivable outside the oil and gas industry.

The engine in accordance with the present disclosure can be used for stationary or mobile power generation.

REFERENCES

[BucLau2014] Buczek, K.; Lauer, S.: Firing order optimization in FEV virtual engine. Proceedings of the Torsional Vibration Symposium 2014, Salzburg, May 2014.
[Hen2014a] Henninger, C.: Firing Sequence Optimization for a V20 Cylinder Diesel Engine. Proceedings of the Torsional Vibration Symposium 2014, Salzburg, May 2014.
[Hen2014b] Henninger, C.: Firing Sequence Optimisation on a V20. MTZ industrial 02(2014), pp. 60-65.
[KnoMal2010] Knorr, J.; Malischewski, T.; Weiss, J.: Firing Order Optimization Based on Integrated Simulation. GTI User Conference 2010.
[MaaKli1981] Maass, H.; Klier, H.: Kräfte, Momente und deren Ausgleich in der Verbrennungskraftmaschine. Wien, 1981 [Forces, Torques and Their Compensation in the Internal Combustion Engine. Vienna 1981]
[Nes1958] Nestorides, E. J. (Ed.): *A Handbook on Torsional Vibration*. Cambridge, 1958.

[PriOva2014] Priestner, C.; Ovari, T.; Brunner, M.; Zieher, F.: Crank train torsional vibration optimization. Proceedings of the Torsional Vibration Symposium 2014, Salzburg, May 2014.

[RønNie2003] Rønnedal, P.; Nielsen, H. B.: *Firing Order Selection in Relation to Vibration Aspects*. In: Proceedings of the 2003 Spring Technical Conference of the ASME Internal Combustion Engine Division in Salzburg, pp. 311-320, 2003.

[StaHen2014] Stadelmann, M.; Henninger, C.: Mokdad, B.: *Generalized Torsional Vibration Analysis of Generating Sets for Diesel-Electric Powertrains*. Tagungsband zum 4. Kongress zu Einsatz und Validierung von Simulationsmethoden für die Antriebstechnik in Lahnstein, September 2014, S. 182-194 [Conerence Transcript of the $4^{th}$ Congress on the Use and Validation of Simulation Methods for Drive Engineering in Lahnstein, September 2014, pp. 128-194].

[Wil1935] Wilson, W. K.: *Practical Solution of Torsional Vibration Problems*. London, 1935.

The invention claimed is:

1. A four-stroke reciprocating piston engine in a V configuration having 16 cylinders, having a counter-clockwise direction of rotation, having an ignition timing control which fires the cylinders A1 to A8 and B1 to B8 in one of the following firing sequences, wherein the direction of rotation and the cylinder numbering are defined in accordance with DIN ISO 1204:
   a) A1-B2-A5-B4-A7-B8-A3-A8-B5-A6-B7-A2-B3-A4-B1-B6
   b) A1-B2-A5-A2-B3-A4-B1-A8-B5-A6-B7-B4-A7-B8-A3-B6
   c) A1-B4-A3-B2-A7-B6-A5-B8-B3-A8-B7-A4-B5-A2-B1-A6
   d) A1-B4-A3-B2-B5-A2-B1-A6-B3-A8-B7-A4-A7-B6-A5-B8
   e) A1-B2-A6-B4-A8-A4-B1-A7-B6-A5-B8-A2-B3-B7-A3-B5
   f) A1-B2-A6-B4-A8-B7-A3-A7-B6-A5-B8-A2-B3-A4-B1-B5
   g) A1-B2-A6-A2-B3-A4-B1-A7-B6-A5-B8-B4-A8-B7-A3-B5
   h) A1-B4-A3-B2-A8-B5-A6-B7-B3-A7-B8-A4-B6-A2-B1-A5
   i) A1-B4-B8-A4-B6-A2-B1-A5-B3-A7-A3-B2-A8-B5-A6-B7
   j) A1-B4-A3-B2-B6-A2-B1-A5-B3-A7-B8-A4-A8-B5-A6-B7
   k) A1-B2-A6-B5-A8-A5-B1-A7-B6-A4-B8-A2-B3-B7-A3-B4
   l) A1-B2-A6-B5-A8-B7-A3-A7-B6-A4-B8-A2-B3-A5-B1-B4
   m) A1-B2-A6-A2-B3-A5-B1-A7-B6-A4-B8-B5-A8-B7-A3-B4
   n) A1-B5-A3-B2-A8-B4-A6-B7-B3-A7-B8-A5-B6-A2-B1-A4
   o) A1-B5-B8-A5-B6-A2-B1-A4-B3-A7-A3-B2-A8-B4-A6-B7
   p) A1-B5-A3-B2-B6-A2-B1-A4-B3-A7-B8-A5-A8-B4-A6-B7.

2. The four-stroke reciprocating piston engine in accordance with claim 1, having a crank shaft and a flywheel arranged on the crankshaft, wherein the crankshaft has cranks which form a crank star and at which the connecting rods of the cylinders engage, with the connecting rods of a V segment respectively engaging at a common crank;

wherein the cranks C1 to C8 have one of the following sequences in the direction of rotation, viewed from the flywheel side, with the cranks being numbered in order by C1 to C8 starting from the flywheel side:
   i) C1-C8-C3-C4-C7-C2-C5-C6
   v) C1-C7-C3-C5-C8-C2-C6-C4;
   wherein the following combination of crank star and firing sequence is present:
      Crank star i), one of the firing sequences a, b
      Crank star v), one of the firing sequences k, l, m;
or wherein the cranks C1 to C8 have one of the following sequences in the direction of rotation, viewed from the flywheel side, with the cranks being numbered in order by C1 to C8 starting from the flywheel side
   ii) C1-C6-C5-C2-C7-C4-C3-C8
   iii) C1-C7-C3-C4-C8-C2-C6-C5
   iv) C1-C5-C6-C2-C8-C4-C3-C7
   vi) C1-C4-C6-C2-C8-C5-C3-C7;
   wherein one of the following combinations of crank star and firing sequence is present:
      Crank star ii), one of the firing sequences c, d
      Crank star iii), one of the firing sequences e, f, g
      Crank star iv), one of the firing sequences h, i, j
      Crank star vi), one of the firing sequences n, o, p.

3. The four-stroke reciprocating piston engine in accordance with claim 1, wherein the V angle amounts to between 85° and 95°.

4. The four-stroke reciprocating piston engine in accordance with claim 1, wherein the firing sequences have an equidistant or quasi-equidistant firing interval; and wherein the firing interval between two consecutive firings amounts to between 40° and 50°.

5. The four-stroke reciprocating piston engine in accordance with claim 1, having a simple crank star; and/or wherein the crankshaft has eight cranks which form a crank star and at which the connecting rods of the cylinders engage; wherein the connecting rods of a V segment respectively engage at a common crank; wherein it is a simple crank star in which the cranks are distributed equidistantly or quasi-equidistantly; and wherein the angular spacing between cranks following one another at an angle between 40° and 50°.

6. The four-stroke reciprocating piston engine in accordance with claim 1, wherein the crankshaft is produced from steel for precipitating hardening from hot-working temperatures;
   and/or having a torsional vibration damper, wherein the power loss of the torsional vibration damper amounts to less than 6 per thousand of the maximum engine power;
   and/or wherein it is a viscous oil torsional vibration damper;
   and/or having a crankshaft and a flywheel arranged on the crankshaft, with the torsional vibration damper arranged at the side of the crankshaft disposed opposite the flywheel.

7. The four-stroke reciprocating piston engine in accordance with claim 1,
   wherein the cylinder displacement amounts to between 1 l and 10 l;
   and/or wherein the maximum power per liter displacement amounts to between 20 kW and 80 kW;
   and/or wherein the engine is operable in a speed range which lies between 400 and 3000 r.p.m;
   and/or wherein the engine has an engine speed control which operates the engine at a desired engine speed, with the desired engine speed being adaptable to engine and/or load conditions by the engine control.

8. The four-stroke reciprocating piston engine in accordance with claim 1, wherein the engine has separate intake and/or exhaust manifolds for the two cylinder banks;

and/or wherein the engine is a gas engine and/or is operable with a liquid fuel, with the engine being operable with at least one of the following fuels: hydrogen, natural gas, biogas and/or liquefied gas, diesel and/or gasoline;

and/or wherein the engine has direct injection and/or high-pressure injection;

and/or wherein the engine is operable by a diesel combustion method or by a gasoline combustion method;

and/or wherein the engine control is configured such that the engine is operable by a homogeneous, a stratified and/or another combustion method;

and/or wherein the engine is a naturally aspirated engine or has a single-stage or multi-stage charge.

9. The four-stroke reciprocating piston engine in V configuration in accordance with claim 1, wherein the engine is used as a drive in a heavy-duty machine; and/or mining machinery; and/or an earth-moving machine; and/or a transport machine and/or a transfer machine; wherein the engine drives a generator or a hydraulic pump via which an undercarriage and/or working units of the heavy-duty machine, and/or mining machinery; and/or earth-moving machine; and/or transport machine; and/or transfer machine are driven; and/or wherein the engine drives an undercarriage; and/or working units of the heavy-duty machine and/or mining machinery; and/or earth-moving machine; and/or transport machine; and/or transfer machine directly or via a transmission which is further connected to the engine by means of a mechanical clutch and/or a torque converter; wherein the heavy-duty machine; and/or mining machinery; and/or earth-moving machine; and/or transport machine; and/or transfer machine is a stationary machine or a mobile machine;

and/or wherein the engine is used as the main drive in a ship;

and/or in that the engine is used as the main drive in a rail vehicle;

and/or wherein the engine is used as the main drive in heavy military applications;

and/or wherein the engine is used as a drive in fluid-conveying technology and/or in the oil and gas industry;

and/or wherein the engine is used for power generation, with the four-stroke reciprocating piston engine driving a generator;

and/or wherein the crankshaft of the engine and the load are connected to one another in a torsionally rigid manner or via a torsionally flexible coupling.

10. A machine with the four-stroke reciprocating piston engine in accordance with claim 1, wherein the machine is a stationary machine or a mobile machine, a heavy-duty machine, and/or mining machinery; and/or earth-moving machine; and/or transport machine; and/or transfer machine; a ship; a rail vehicle; a heavy military machine; a fluid-conveying machine; an oil-extraction and/or gas-extraction machine; an oil and/or gas transport machine; and/or oil and/or gas processing machine; and/or a power generation unit.

11. The four-stroke reciprocating piston engine in accordance with claim 1, wherein the crankshaft is produced from steel for precipitating hardening from hot-working temperatures;

and/or having a torsional vibration damper, wherein the power loss of the torsional vibration damper amounts to less than 6 per thousand of the maximum engine power; and/or wherein it is a viscous oil torsional vibration damper;

and/or having a crankshaft and a flywheel arranged on the crankshaft, with the torsional vibration damper arranged at the side of the crankshaft disposed opposite the flywheel.

12. The four-stroke reciprocating piston engine in accordance with claim 1, wherein the crankshaft is produced from steel for precipitating hardening from hot-working temperatures;

and/or having a torsional vibration damper, wherein the power loss of the torsional vibration damper amounts to less than 6 per thousand of the maximum engine power; and/or wherein it is a viscous oil torsional vibration damper;

and/or having a crankshaft and a flywheel arranged on the crankshaft, with the torsional vibration damper arranged at the side of the crankshaft disposed opposite the flywheel.

13. A four-stroke reciprocating piston engine in a V configuration having 16 cylinders, having a clockwise direction of rotation, having an ignition timing control which fires the cylinders A1 to A8 and B1 to B8 in one of the following firing sequences, wherein the direction of rotation and the cylinder numbering are defined in accordance with DIN ISO 1204:

a) A1-A6-B1-A2-B5-A4-B7-A8-B3-B8-A5-B6-A7-B2-A3-B4
b) A1-B8-A5-B6-A7-A4-B7-A8-B3-A6-B1-A2-B5-B2-A3-B4
c) A1-B6-B1-A4-B3-A2-B7-A6-B5-A8-A3-B8-A7-B4-A5-B2
d) A1-B6-A3-B8-A7-B4-B7-A6-B5-A8-B1-A4-B3-A2-A5-B2
e) A1-B7-A6-B5-A8-B2-A3-A7-B3-A5-B1-A2-B6-A4-B8-B4
f) A1-A5-B1-A2-B6-A4-B8-A7-B3-B7-A6-B5-A8-B2-A3-B4
g) A1-B7-A6-B5-A8-A4-B8-A7-B3-A5-B1-A2-B6-B2-A3-B4
h) A1-B5-B1-A4-B3-A2-B8-A5-B6-A7-A3-B7-A8-B4-A6-B2
i) A1-B5-A3-B7-B3-A2-B8-A5-B6-A7-B1-A4-A8-B4-A6-B2
j) A1-B5-A3-B7-A8-B4-B8-A5-B6-A7-B1-A4-B3-A2-A6-B2
k) A1-B7-A6-B4-A8-B2-A3-A7-B3-A4-B1-A2-B6-A5-B8-B5
l) A1-A4-B1-A2-B6-A5-B8-A7-B3-B7-A6-B4-A8-B2-A3-B5
m) A1-B7-A6-B4-A8-A5-B8-A7-B3-A4-B1-A2-B6-B2-A3-B5
n) A1-B4-B1-A5-B3-A2-B8-A4-B6-A7-A3-B7-A8-B5-A6-B2
o) A1-B4-A3-B7-B3-A2-B8-A4-B6-A7-B1-A5-A8-B5-A6-B2
p) A1-B4-A3-B7-A8-B5-B8-A4-B6-A7-B1-A5-B3-A2-A6-B2.

14. The four-stroke reciprocating piston engine in accordance with claim 13, having a crank shaft and a flywheel arranged on the crankshaft, wherein the crankshaft has cranks which form a crank star and at which the connecting rods of the cylinders engage, with the connecting rods of a V segment respectively engaging at a common crank;

wherein the cranks C1 to C8 have one of the following sequences in the direction of rotation, viewed from the flywheel side, with the cranks being numbered in order by C1 to C8 starting from the flywheel side:
  i) C1-C8-C3-C4-C7-C2-C5-C6
  v) C1-C7-C3-C5-C8-C2-C6-C4;
wherein the following combination of crank star and firing sequence is present:
  Crank star i), one of the firing sequences a, b
  Crank star v), one of the firing sequences k, l, m;
or wherein the cranks C1 to C8 have one of the following sequences in the direction of rotation, viewed from the flywheel side, with the cranks being numbered in order by C1 to C8 starting from the flywheel side
  ii) C1-C6-C5-C2-C7-C4-C3-C8
  iii) C1-C7-C3-C4-C8-C2-C6-C5
  iv) C1-C5-C6-C2-C8-C4-C3-C7
  vi) C1-C4-C6-C2-C8-C5-C3-C7;
wherein one of the following combinations of crank star and firing sequence is present:
  Crank star ii), one of the firing sequences c, d
  Crank star iii), one of the firing sequences e, f, g
  Crank star iv), one of the firing sequences h, i, j
  Crank star vi), one of the firing sequences n, o, p.

15. The four-stroke reciprocating piston engine in accordance with claim 13, wherein the V angle amounts to between 85° and 95°.

16. The four-stroke reciprocating piston engine in accordance with claim 13, wherein the firing sequences have an equidistant or quasi-equidistant firing interval; and wherein the firing interval between two consecutive firings amounts to between 40° and 50°.

17. The four-stroke reciprocating piston engine in accordance with claim 13, having a simple crank star; and/or wherein the crankshaft has eight cranks which form a crank star and at which the connecting rods of the cylinders engage; wherein the connecting rods of a V segment respectively engage at a common crank; wherein it is a simple crank star in which the cranks are distributed equidistantly or quasi-equidistantly; and wherein the angular spacing between cranks following one another at an angle between 40° and 50°.

18. A four-stroke reciprocating piston engine in a V configuration having 16 cylinders, having a counter-clockwise or clockwise direction of rotation, having a crank shaft and a flywheel arranged on the crankshaft, wherein the crankshaft has cranks which form a crank star and at which the connecting rods of the cylinders engage, with the connecting rods of a V segment respectively engaging at a common crank;
  wherein the cranks C1 to C8 have one of the following sequences in the direction of rotation, viewed from the flywheel side, with the cranks being numbered in order by C1 to C8 starting from the flywheel side
    ii) C1-C6-C5-C2-C7-C4-C3-C8
    iii) C1-C7-C3-C4-C8-C2-C6-C5
    iv) C1-C5-C6-C2-C8-C4-C3-C7
    vi) C1-C4-C6-C2-C8-C5-C3-C7.

19. The four-stroke reciprocating piston engine in accordance with claim 18, wherein the V angle amounts to between 85° and 95°.

20. The four-stroke reciprocating piston engine in accordance with claim 3, wherein the firing sequences have an equidistant or quasi-equidistant firing interval; and wherein the firing interval between two consecutive firings amounts to between 40° and 50°.

21. The four-stroke reciprocating piston engine in accordance with claim 18, having a simple crank star; and/or wherein the crankshaft has eight cranks which form a crank star and at which the connecting rods of the cylinders engage; wherein the connecting rods of a V segment respectively engage at a common crank; wherein it is a simple crank star in which the cranks are distributed equidistantly or quasi-equidistantly; and wherein the angular spacing between cranks following one another at an angle between 40° and 50°.

* * * * *